United States Patent
Loomis

(10) Patent No.: US 10,337,710 B2
(45) Date of Patent: Jul. 2, 2019

(54) TREE WITH INTEGRATED LIGHTING ELEMENTS RECEIVING POWER AND CONTROL DATA OVER COMMON CONDUCTORS

(71) Applicant: Seasons 4, Inc., Toano, VA (US)

(72) Inventor: Jason Loomis, Decatur, GA (US)

(73) Assignee: Seasons 4, Inc., Toana, VA (US)

( * ) Notice: Subject to any disclaimer, the term of this patent is extended or adjusted under 35 U.S.C. 154(b) by 0 days.

(21) Appl. No.: 16/178,367

(22) Filed: Nov. 1, 2018

(65) Prior Publication Data

US 2019/0078767 A1 Mar. 14, 2019

Related U.S. Application Data

(63) Continuation-in-part of application No. 15/991,754, filed on May 29, 2018, now Pat. No. 10,225,916, which is a continuation-in-part of application No. 15/967,184, filed on Apr. 30, 2018, now Pat. No. 10,117,298, which is a continuation-in-part of application No. 15/484,847, filed on Apr. 11, 2017, now Pat. No. 9,986,610.

(60) Provisional application No. 62/658,376, filed on Apr. 16, 2018.

(51) Int. Cl.
| | |
|---|---|
| *H05B 37/02* | (2006.01) |
| *F21V 23/00* | (2015.01) |
| *F21V 23/04* | (2006.01) |
| *A41G 1/00* | (2006.01) |
| *F21S 4/10* | (2016.01) |
| *F21Y 103/00* | (2016.01) |
| *F21Y 115/10* | (2016.01) |

(52) U.S. Cl.
CPC ............ *F21V 23/002* (2013.01); *A41G 1/007* (2013.01); *F21V 23/003* (2013.01); *F21V 23/0435* (2013.01); *F21S 4/10* (2016.01); *F21Y 2103/00* (2013.01); *F21Y 2115/10* (2016.08); *H05B 37/0272* (2013.01); *H05B 37/0281* (2013.01)

(58) Field of Classification Search
CPC .. F21V 23/002; F21V 23/003; F21V 23/0435; F21S 4/10; F21Y 2115/10; F21Y 2103/00; A41G 1/007; H05B 37/0227; H05B 37/0272; H05B 37/028
See application file for complete search history.

(56) References Cited

U.S. PATENT DOCUMENTS

| | | |
|---|---|---|
| 7,508,141 B2 | 3/2009 | Wong |
| 8,217,587 B2 | 7/2012 | Sauerlaender |
| 8,450,950 B2 | 5/2013 | McRae |
| 8,807,796 B2 | 8/2014 | Li |
| 8,941,312 B2 | 1/2015 | McRae |
| 8,988,013 B2 | 3/2015 | McRae |
| 9,007,000 B2 | 4/2015 | Szczeszynski et al. |

(Continued)

*Primary Examiner* — Jimmy T Vu

(74) *Attorney, Agent, or Firm* — Kinney & Lange, P.A.

(57) ABSTRACT

Apparatus and associated methods relate to apparatus and methods for distributing a plurality of lighting control signals to a plurality of independently-controllable lighting elements coupled to an artificial tree. A subset of the plurality of lighting control signals are transmitted to each of the plurality of branch segments. Both operating power and these subsets of lighting control signals are transmitted to the independently-controllable lighting elements via two-conductor wires that engage each of the branch segments.

20 Claims, 22 Drawing Sheets

(56) References Cited

U.S. PATENT DOCUMENTS

| | | |
|---|---|---|
| 9,089,030 B2 | 7/2015 | Neuman |
| 9,258,861 B2 | 2/2016 | Chu et al. |
| 9,313,846 B2 | 4/2016 | Chen et al. |
| 9,374,857 B2 | 6/2016 | McRae et al. |
| 2014/0035481 A1 | 2/2014 | Peting et al. |
| 2015/0084515 A1 | 3/2015 | Altamura et al. |
| 2015/0359066 A1* | 12/2015 | Loomis .............. H05B 37/0245 362/123 |

* cited by examiner

TREE WITH INTEGRATED LIGHTING ELEMENTS RECEIVING POWER AND CONTROL DATA OVER COMMON CONDUCTORS

CROSS-REFERENCE TO RELATED APPLICATION(S)

This application is a continuation in part of U.S. patent application Ser. No. 15/991,754 entitled "Data/Power Controller for Translation between Light Control Protocols" filed May 29, 2018 by Jason Loomis and Jared William Everline, which is a continuation in part of U.S. patent application Ser. No. 15/967,184 entitled "Curtain-Configured Light Strings" filed Apr. 30, 2018 by Jason Loomis and Jared William Everline, which in turn is a continuation-in-part of U.S. patent application Ser. No. 15/484,847, entitled "Long-Chain-Tolerant Decorative Strings of Independently Illumination Controllable LEDs" filed Apr. 11, 2017 by Jason Loomis and Jared William Everline, which are hereby incorporated by reference. This application also claims the benefit of U.S. Provisional Application No. 62/658,376 filed Apr. 16, 2018 for "Stowable and Deployable Tree Sections and Axial Tree Connector" by Jason Loomis, which is hereby incorporated by reference.

BACKGROUND

Decorative light strings are used to communicate a joy of a holiday season, to draw attention to merchandise, or to simply decorate or adorn an object. Decorative light strings can be used both indoors and outdoors. Decorative light strings have been used residentially to adorn trees, shrubs, and houses. Commercial businesses can use decorative light strings to provide festive atmospheres at their places of business.

Some such decorations can involve many decorative light strings. These light strings are often connected in series fashion. Series-connected decorative light strings receive their operating power from a connector at a first end and deliver power to strings connected to a second end of the decorative light string. Thus, a first decorative light string in a series-connected chain of decorative light strings carries the operating current for the entire series-connected chain of decorative light strings. Conversely, a last decorative light string in the series-connected chain will only carry the operating current for that last decorative light string.

Light strings traditionally have been constructed using incandescent bulbs. Light strings that use incandescent bulbs often have been powered using AC line voltages. In more recently times, Light Emitting Diodes (LED) have been used in light strings. LEDs usually require low-voltage DC power for illumination. Therefore, decorative light strings that use LEDs can be powered by low-voltage power levels. Providing a low-voltage power level to a series-connected chain of decorative light strings, however, can result in high current levels. Such high current levels can cause voltage droop along the series-connected chain, which in turn can cause the LEDs of the last decorative light string to be noticeably dimmer than the LEDs of the first decorative light string. Thus, a method of providing power to long chains of series-connected LED light strings that minimizes the dimming of the last decorative light string of the chain is desired.

SUMMARY

Apparatus and associated methods relate to an artificial tree apparatus that includes a mount, a trunk, a trunk electrical distribution network of conductive wires, a plurality of branch segments, one or more branch electrical distribution networks or conductive wires, and a plurality of independently-controllable lighting elements. The mount is configured to engage a level floor surface. The trunk segment is configured to couple to the mount so as to be vertically erected with respect to the level floor surface. The trunk electrical distribution network of conductive wires engages the trunk segment and includes an electrical connector conductively coupled thereto. The electrical connector has a plurality of electrical contacts configured to couple to a complementary electrical connector so as to receive operating power therefrom. The trunk electrical distribution network is configured to conductively provide thereon both the operating power received by the electrical connector and a plurality of lighting control signals. Each of the plurality of branch segments is connected to and extends from the trunk segment. The one or more branch electrical distribution networks of conductive wires engages the plurality of branch segments, and is configured to receive, from the trunk electrical distribution system, both operating power and at least a subset of the plurality of lighting control signals. Each of the one or more branch electrical distribution networks is further configured to superimpose thereon both the received operating power and the received at least a subset of the plurality of the lighting control signals. The plurality of independently-controllable lighting elements is disposed along and conductively coupled to the one or more branch electrical distribution networks. Each of the plurality of independently-controllable lighting elements has a local controller configured to control illumination by providing, in response to a corresponding one of the plurality of lighting control signals provided thereto, controlled illumination of the independently controllable lighting element.

DETAILED DESCRIPTION

Apparatus and associated methods relate to a series-connectable decorative light string. High-voltage power is received via a first electrical connecter at a first end of the decorative light string and is conducted to a complementary second electrical connector at a second end of the decorative light string. The decorative light string has a power converter that converts the received high-voltage power to low-voltage DC power for consumption by a plurality of lighting elements distributed along the decorative light string. Each of the plurality of lighting elements has an illumination controller. The plurality of lighting elements is wired in daisy chain fashion from the first electrical connector to the second electrical connector via data-in and data-out ports of each lighting element. The wire high-voltage power received by the first electrical connector can provide power to additional decorative light strings connected via the second electrical connector without resulting in degraded illumination.

Figure 1:
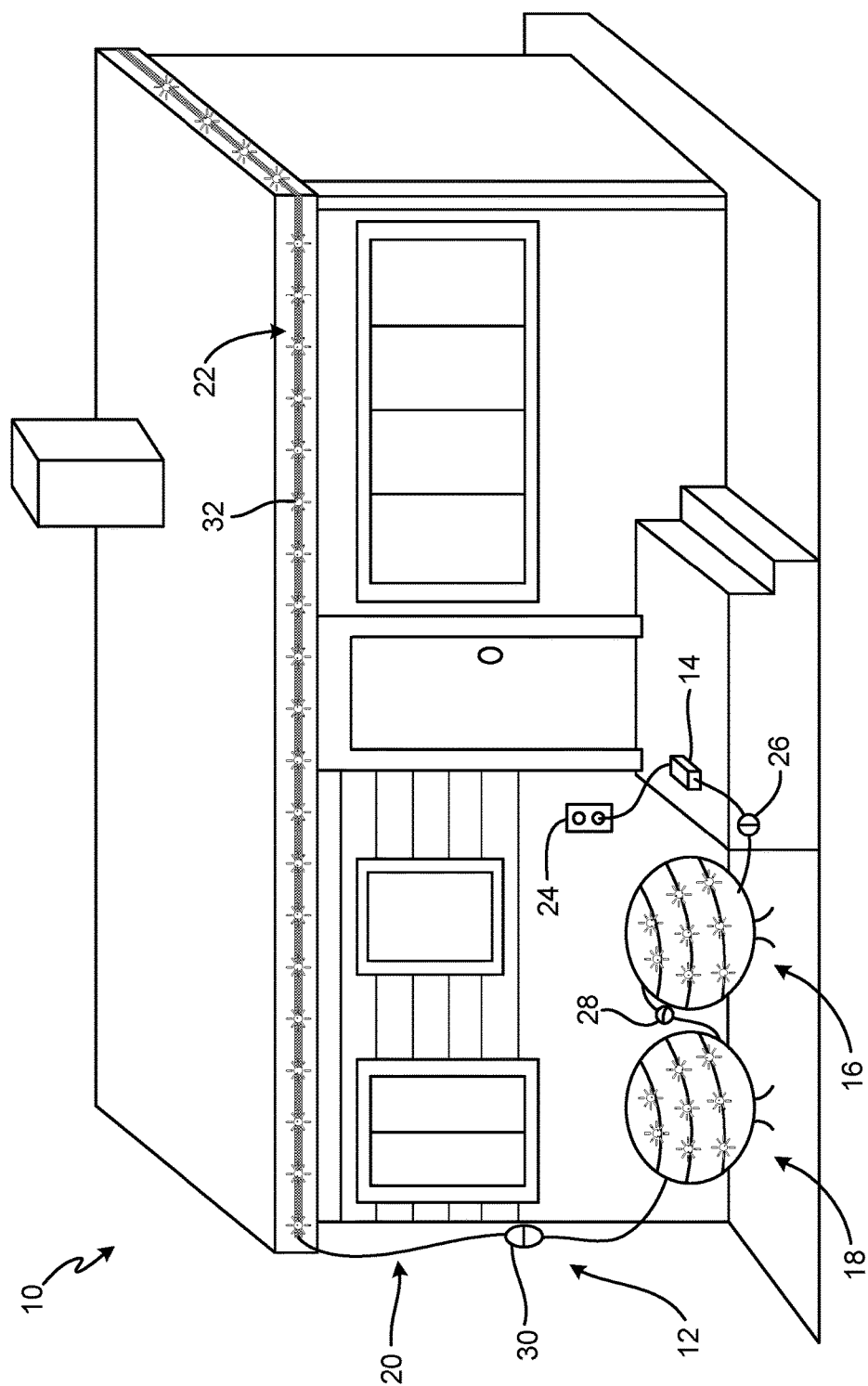
FIG. 1 is a schematic view of a home decorated with long chain of series-connected decorative light strings.

FIG. 1 is a schematic view of a home decorated with long chain of series-connected decorative light strings. In FIG. 1, home 10 is decorated with lighting system 12 for a holiday season. Lighting system 12 includes a power supply 14 and decorative LED light strings 16, 18, 20 and 22. Power supply 14 is plugged into house outlet 24 and draws operating current from standard AC line voltage (e.g., 120 VAC). Decorative light strings 16, 18, 20 and 22 are series connected. First decorative LED light string 16 is connected to power supply 14 via connector pair 26. Second decorative LED light string 18 is connected to first decorative LED light string 16 via connector pair 28. Third decorative LED light string 20 is connected to second decorative LED light string 18 via connector pair 30. Fourth decorative LED light string 22 is connected to third decorative LED light string 20 via connector pair 32. Each of connector pairs 26, 28, 30 and 32 include a connector coupled to a first of the connected elements (e.g., a connector of power supply 14), and a complementary connector coupled to a second of the connected elements (e.g., a connector of first decorative light string 16).

Operating power for decorative LED light strings 16, 18, 20 and 22 is provided by power supply 14. In some embodiments, power supply 14 converts power from standard AC line voltage to a form compatible with LED light strings 16, 18, 20 and 22. For example, in an exemplary embodiment power supply 14 converts 120 VAC power to high-voltage DC power. In other embodiments, however, decorative light strings 16, 18, 20 and 22 can be made to be compatible with 120 VAC. In such embodiments, power supply 14 can be omitted, and first decorative LED light string 16 can be directly plugged into house outlet 24. Regardless of the specific power configuration, the chain of series-connected decorative LED light strings 16, 18, 20 and 22 is supplied operating power, both voltage and current, through the connector of connector pair 26 that is coupled to first decorative LED light string 16.

All operating current for decorative LED light strings 16, 18, 20 and 22 will be conducted through connector pair 26 in lighting system 12 as depicted in FIG. 1. Connector pair 28 will conduct operating current for decorative LED light strings 18, 20 and 22. Connector pair 30 will conduct operating current for decorative LED light strings 20 and 22. Connector pair 32 will conduct operating current only for decorative LED light strings 22. Operating power for decorative LED light strings 16, 18, 20 and 22 is calculated as the product of the operating voltage and the operating current. Thus, a specific operating power can be achieved using different voltages and currents. For example, a first power configuration may use high operating current and low operating voltage to achieve a specific operating power, while a second power configuration may use a lower operating current a higher operating voltage.

Although both the first and second power configurations achieve the same operating power, the current differences can have secondary consequence. Because the operating current for light strings 16, 18, 20 and 22 is conducted through connector pair 26, a voltage drop will occur across connector pair 26, as connector pair 26 has a non-zero parasitic resistance associated with connector pair 26. Furthermore, a voltage drop will occur across both decorative LED light sting 16 and connector pair 28 due to parasitic resistances, as a result of conduction therethrough of operating current for lights strings 18, 20 and 22. The first power configuration, which achieves the specific operating power using high operating currents will have larger voltage drops across lighting elements 26, 16, 28, etc. than will the second power configuration which achieves the same specific operating power but uses lower operating currents. Use of high-voltage/low-current power configurations can permit the use of long chains of series-connected decorative LED light strings.

Figure 2:
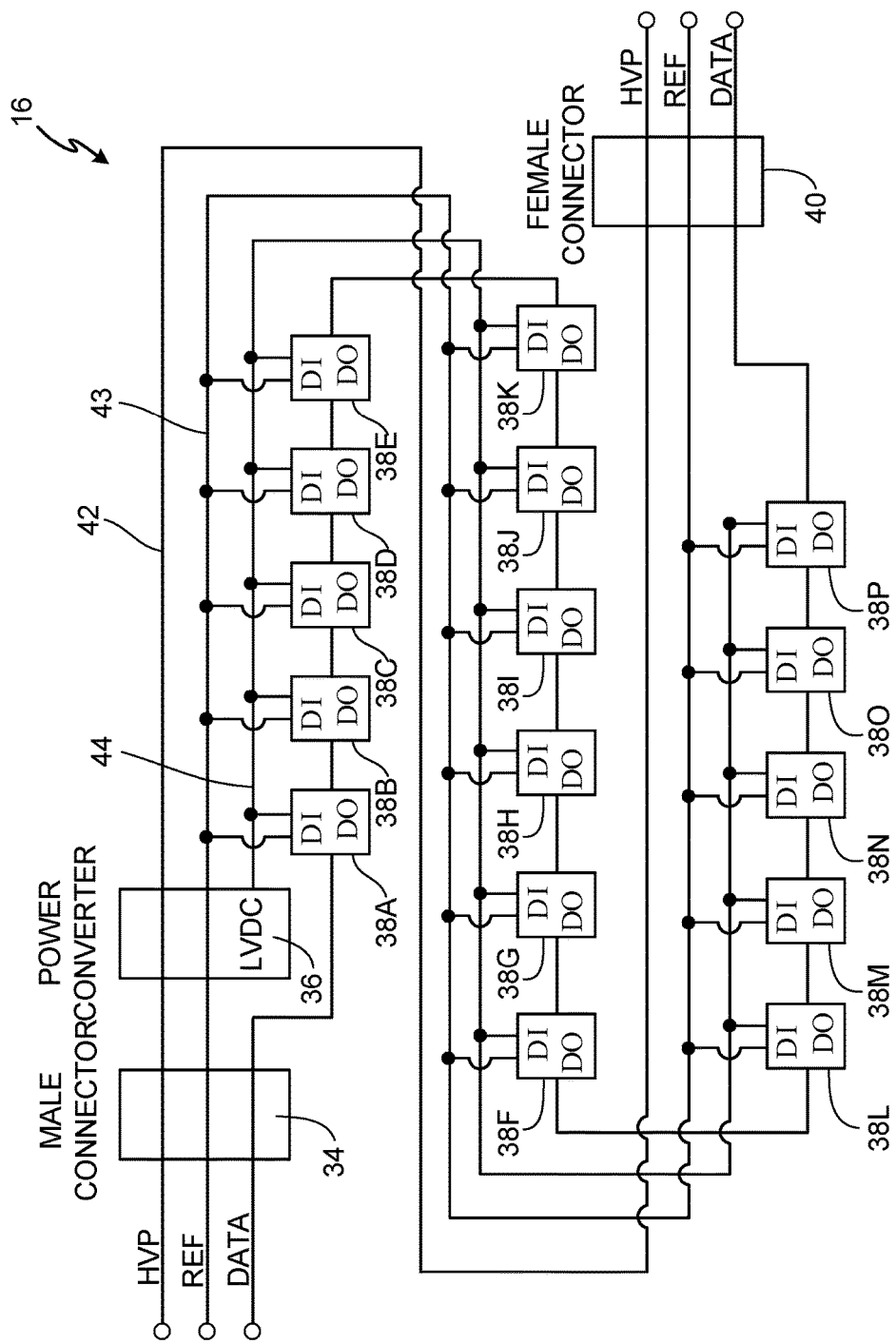
FIG. 2 is a schematic diagram of an exemplary long-chain-tolerant decorative LED light string.

FIG. 2 is a schematic diagram of an exemplary long-chain-tolerant decorative LED light string. In FIG. 2, decorative LED light string 16 of FIG. 1 is shown in schematic form. Decorative LED light string 16 includes first connector 34, power converter 36, lighting elements 38A-38P, and second connector 40. First connector 34 is labeled as MALE CONNECTOR, and second connector 40 is labeled as FEMALE CONNECTOR in the depicted embodiment. Various embodiments can have various configurations of connectors. To facilitate series connectivity of multiple decorative LED light stings, however, first connector 34 and second connector 40 are complementary connectors. Connectors are complementary when they mate or engage with one another. Thus, first connector 34 of a subsequent and decorative LED light string (and perhaps identical to decorative LED light string 16, e.g., decorative light string 18 depicted in FIG. 1) can mate or engage with second connector 40 of decorative LED light string 16 depicted in FIGS. 1 and 2, if first connector 34 and second connector 40 are complementary to one another.

In the depicted embodiment connectors 34 and 40 each has three contacts. First connector 34 has contacts labeled: i) high-voltage power HVP; ii) power reference REF; and iii) and data-in DATA. Second connector 40 has contacts labeled: i) high-voltage power HVP; ii) power reference REF; and iii) data-out DATA. Contacts HVP and REF of first connector 34 receive operating power for decorative LED light string 16. Conductors 42 and 43 provide electrical conduction of the received operating power to both power converter 36 and second connector 40. Second connector 40 thereby provides operating power to one or more additional decorative LED light string attached thereto.

Power converter 36 converts the received high-voltage power to a low-voltage DC power suitable for consumption by lighting elements 38A-38P. In some embodiments, the received high-voltage power is 120 VAC line power. In such embodiments, power converter 36 converts the received 120 VAC line power to the low-voltage DC power suitable for consumption by lighting elements 38A-38P. In some embodiments, the received high-voltage power is a high-voltage DC power. For example, in an exemplary embodiment, power supply (depicted in FIG. 1) converts 120 VAC line power to high-voltage DC power by rectifying and filtering the 120 VAC line power. In such embodiments, power converter 36 converts the received high-voltage DC power to the low-voltage DC power suitable for consumption by lighting elements 38A-38P. In still other embodiments, power converter 36 is configured to convert power from other high-voltage power specifications to the low-voltage DC power suitable for consumption by lighting elements 38A-38P.

In the depicted embodiment, power converter 36 provides the low-voltage DC power suitable for consumption by lighting elements 38A-38P on conductor 44. In the depicted embodiment, the converted low-voltage DC power provided to conductor 44 is referenced to power reference REF of conductor 42. Conductors 43 and 44 provide the converted low-voltage DC power to each of lighting elements 38A-38P. In some embodiments, the converted low-voltage DC power will have an isolated reference, independent of power reference REF of conductor 43. In such embodiments, an additional conductor will provide the isolated reference voltage to lighting elements 38A-38P. In such embodiments, the additional conductor along with conductor 44 can provide the converted low-voltage DC power to each of lighting elements 38A-38P.

Lighting elements 38A-38P are identical to one another in the depicted embodiment. Lighting elements 38A-38P are wired in daisy chain fashion from the data-in contact of first connector 34 to the data-out contact of second connector 40 via data-in DI and data-out DO ports of lighting elements 38A-38P. First connector 34 receives illumination control data on the data-in contact of first connector 34. The received illumination control data can independently control the illumination of each of lighting elements 38A-38P, as well as independently controlling lighting elements of one or more decorative LED light strings attached to second connector 40. The received illumination control data may include brightness control, color control, and/or temporal control (e.g., flashing or other temporal lighting variations).

Each of daisy-chained lighting elements 38A-38P receives the illumination control data at data-in port DI. Each of daisy-chained lighting elements 38A-38P then process the received illumination control data and control the illumination based on the received illumination control data. The received illumination control data includes data corresponding to the lighting element that receives the data as well as data corresponding to lighting elements downstream the daisy chain of lighting elements from the lighting element that receives the data. Thus, each of the daisy-chained lighting elements 38A-38P transmits at least some of the received illumination data to downstream lighting elements via the data-out port DO of the lighting element.

Figure 3:
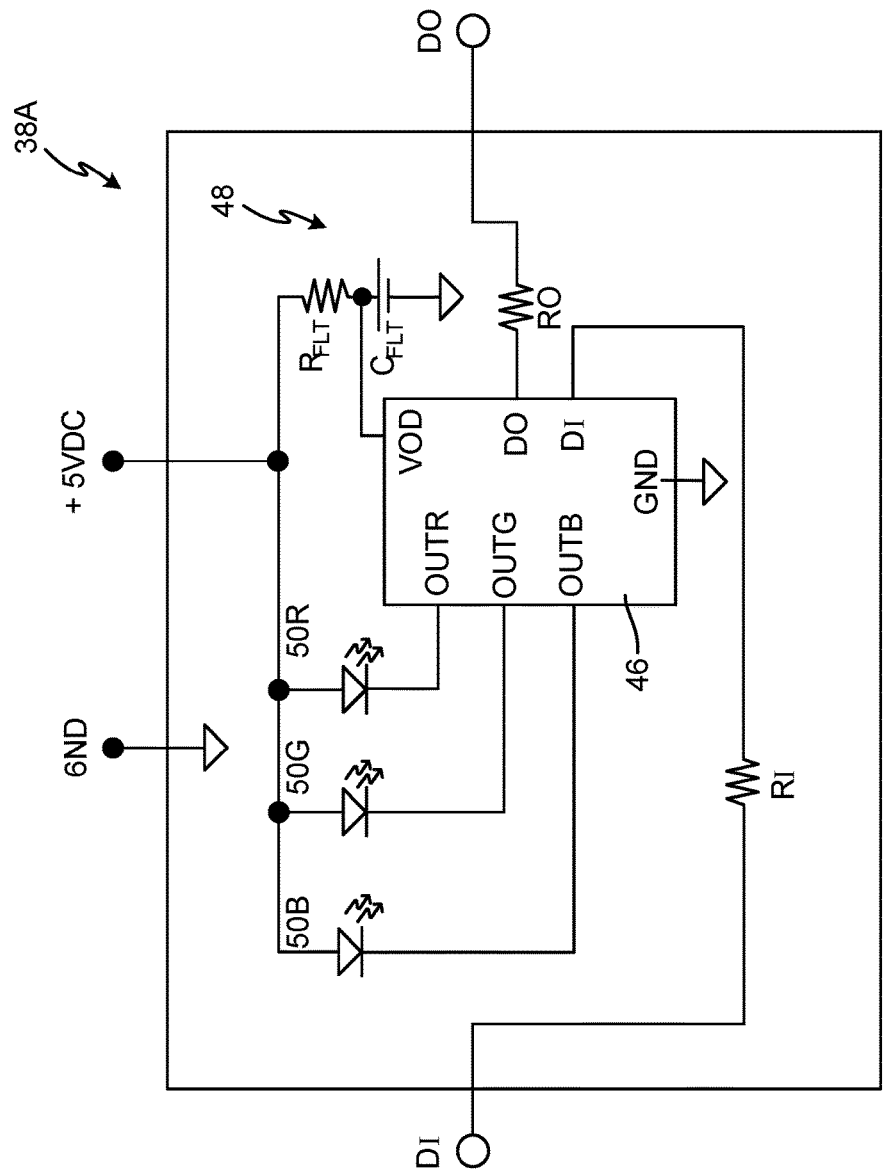
FIG. 3 is a circuit schematic diagram of an exemplary lighting element of a long-chain-tolerant decorative LED light string.

FIG. 3 is a circuit schematic diagram of an exemplary lighting element of a long-chain-tolerant decorative LED light string. In FIG. 3, lighting element 38A of FIG. s is shown in schematic form. Lighting element 38A includes data-in port DI, data-out port DO, ground port GND, low-voltage DC, and power port +5 VDC. Lighting element 38A also includes illumination controller 46, resistors RI and RO, power filter 48, and LEDs 50R, 50G and 50B. In the depicted embodiment, power filter 40 includes resistor $R_{FLT}$ and capacitor $C_{FLT}$. In various embodiments, various power filters can be used. For example, in some embodiments, an inductor can be used in addition to or replacing resistor $R_{FLT}$. In an exemplary embodiment, no power filter is used.

Illumination controller 46 has pins: i) power VDD; ii) ground GND; iii) data-in DI; iv) data-out DO; v) red LED control OUTR; vi) green LED control OUTG; and vii) blue LED control OUTB. LEDs 50R, 50G and 50B each have cathodes that are electrically connected both to one another and to the low-voltage DC power (e.g., +5 VD in the depicted embodiment). Illumination controller 46 controls currents flowing through each of LEDs 50R, 50G and 50B via control pins OUTR, OUTG and OUTB, respectively. Illumination controller 46 controls the currents flowing through LEDs 50R, 50G and 50B based on the illumination control data received on the data-in port DI of lighting element 38A and electrically conducted to the data-in pin DI of illumination controller 46.

In various embodiments, lighting elements 38A-38P can include various configurations of LEDs. For example, in an exemplary embodiment lighting elements 38A-38P can include a red LED, a green LED, and a blue LED. In some embodiments, lighting elements 38A-38P can include other types of LEDs, such as, for example, warm white, pure white, ultra-violet (UV), deep blue, and/or amber LEDs. Such types of LEDs can be including alone or in various combinations in lighting elements 38A-38P.

In various embodiments, illumination controller 46 controls the illumination color, brightness, temporal pattern of illumination. For example, illumination controller 46 can control color by controlling the relative intensities of the red, green and blue light illuminated by LEDs 50R, 50G and 50B, respectively. Illumination controller 46 can control brightness by controlling the absolute intensity of the combination of red, green and blue light illuminated by LEDs 50R, 50G and 50B, respectively. Illumination controller 46 can control the temporal pattern of illumination by temporally changing these relative and absolute intensities as a function of time.

Figure 4:
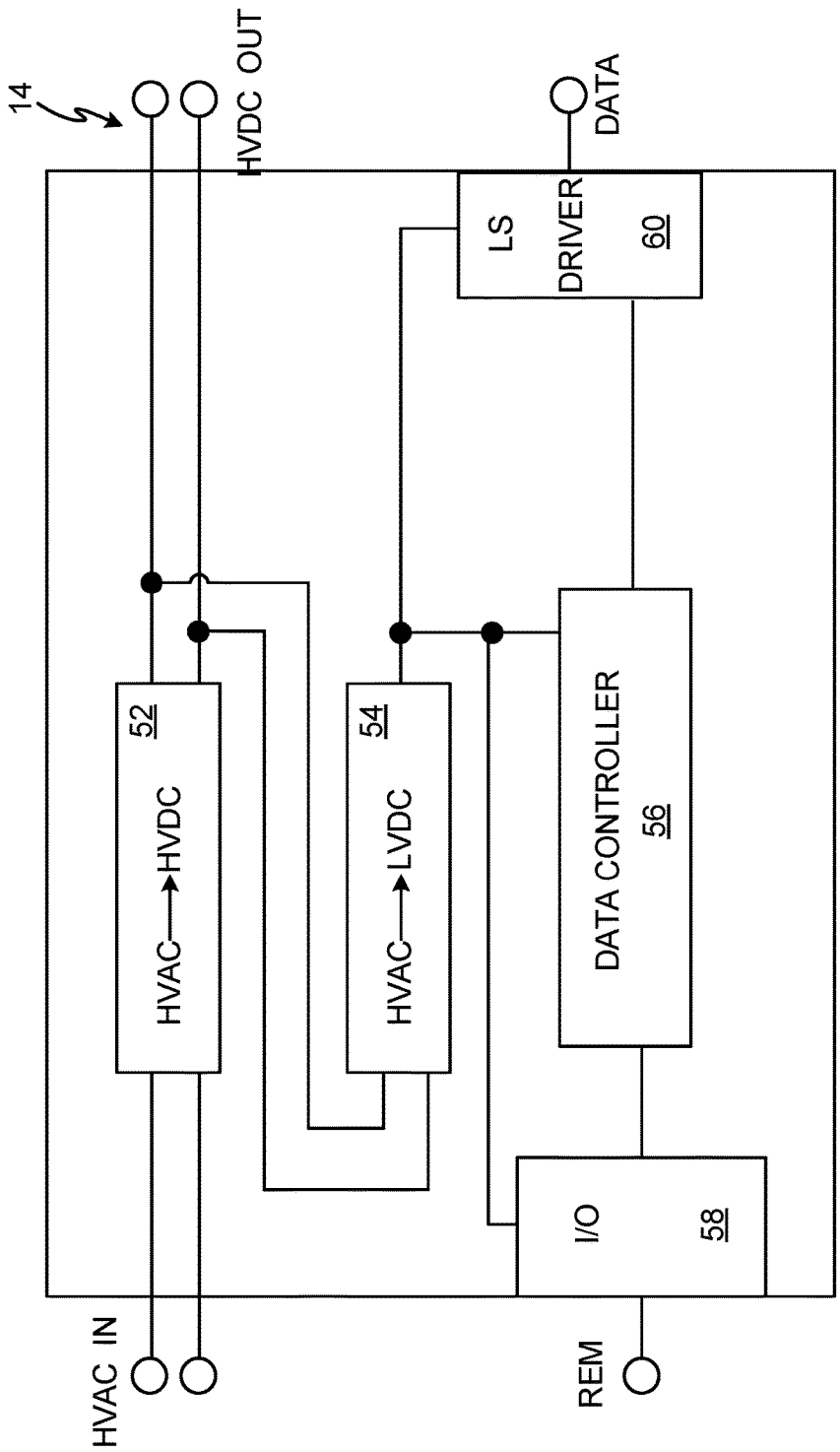
FIG. 4 is a circuit schematic of an exemplary power supply for a long chain of decorative LED light strings.

FIG. 4 is a block schematic of an exemplary power supply for a long chain of decorative LED light strings. In FIG. 4, exemplary power supply 14 depicted in FIG. 1 is shown in block diagram form. Power supply 14 high-voltage AC/high-voltage DC converter, 52, high-voltage DC/low-voltage DC converter 54, data controller 56, input/output interface 58 and light-string driver 60. Power supply 14 also has high-voltage AC input port HVAC_IN, high-voltage DC output port HVDC_OUT, remote data input port REM, and light-string data output port DATA.

High-voltage AC/high-voltage DC converter 52 received high-voltage AC power from high-voltage AC input port HVAC_IN. High-voltage AC/high-voltage DC converter 52 converts the received high-voltage AC power to high-voltage DC power and provide the converted high-voltage DC power to a connected chain of light strings via high-voltage DC output port HVDC_OUT, and provides the converted high-voltage DC power to high-voltage DC/low-voltage DC converter 54. High-voltage DC/low-voltage DC converter 54 converts the received high-voltage DC power to low-voltage DC power and provides the converted low-voltage DC power to each of data controller 56, input/output interface 58 and light-string driver 60.

Data controller 56 generates an illumination control signal and provides it to the connected chain of light strings via light-string data output port DATA. Data controller may store data corresponding to various illumination patterns, and/or may receive various illumination patterns from a remote pattern generator via input/output interface 58.

Figure 5:
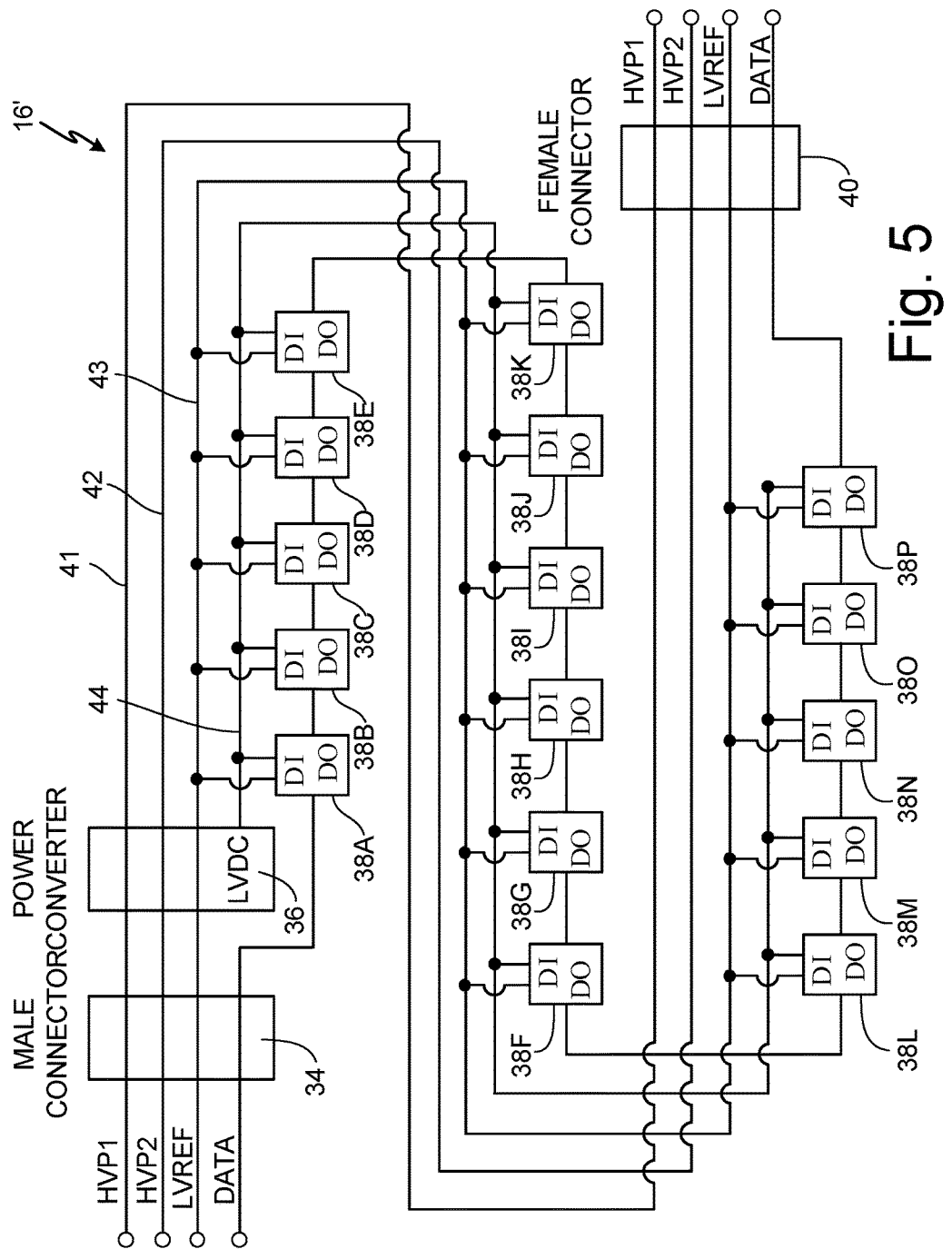
FIG. 5 is a schematic diagram of an exemplary long-chain-tolerant decorative LED light string with separate high-voltage and low-voltage references.

FIG. 5 is a schematic diagram of an exemplary long-chain-tolerant decorative LED light string with separate high-voltage and low-voltage references. Decorative LED light sting 16' depicted in FIG. 5 is the same as Decorative LED light string 16 shown in FIG. 2, except that it has one additional electrical conductor. In the depicted embodiment connectors 34 and 40 each has four contacts. First connector 34 has contacts labeled: i) first high-voltage power HVP1; ii) second high-voltage power HVP2; iii) low-voltage reference LVREF; and iv) and data-in DATA. Second connector 40 has contacts labeled: i) first high-voltage power HVP1; ii) second high-voltage power HVP2; iii) low-voltage reference LVREF; and iv) data-out DATA. Contacts HVP1 and HVP 2 of first connector 34 receive operating power for decorative LED light string 16. Conductors 41 and 42 provide electrical conduction of the received high-voltage operating power to both power converter 36 and second connector 40. Second connector 40 thereby provides operating power to one or more additional decorative LED light string attached thereto.

Power converter 36 converts the received high-voltage power to a low-voltage DC power suitable for consumption by lighting elements 38A-38P. In some embodiments, the received high-voltage power is 120 VAC line power. In such embodiments, power converter 36 converts the received 120 VAC line power to the low-voltage DC power suitable for consumption by lighting elements 38A-38P. In some embodiments, the received high-voltage power is a high-voltage DC power. For example, in an exemplary embodiment, power supply (depicted in FIG. 1) converts 120 VAC line power to high-voltage DC power by rectifying and filtering the 120 VAC line power. In such embodiments, power converter 36 converts the received high-voltage DC power to the low-voltage DC power suitable for consumption by lighting elements 38A-38P. In still other embodiments, power converter 36 is configured to convert power from other high-voltage power specifications to the low-voltage DC power suitable for consumption by lighting elements 38A-38P.

In the depicted embodiment, power converter 36 provides the low-voltage DC power suitable for consumption by lighting elements 38A-38P on conductors 43 and 44. In the depicted embodiment, the converted low-voltage DC power provided to conductors 43 and 44 is referenced to power reference REF of conductor 43. Conductors 43 and 44 provide the converted low-voltage DC power to each of lighting elements 38A-38P. In the depicted embodiment, the converted low-voltage DC power has an isolated reference from the high-voltage power received on conductors 41 and 42.

Figure 6:
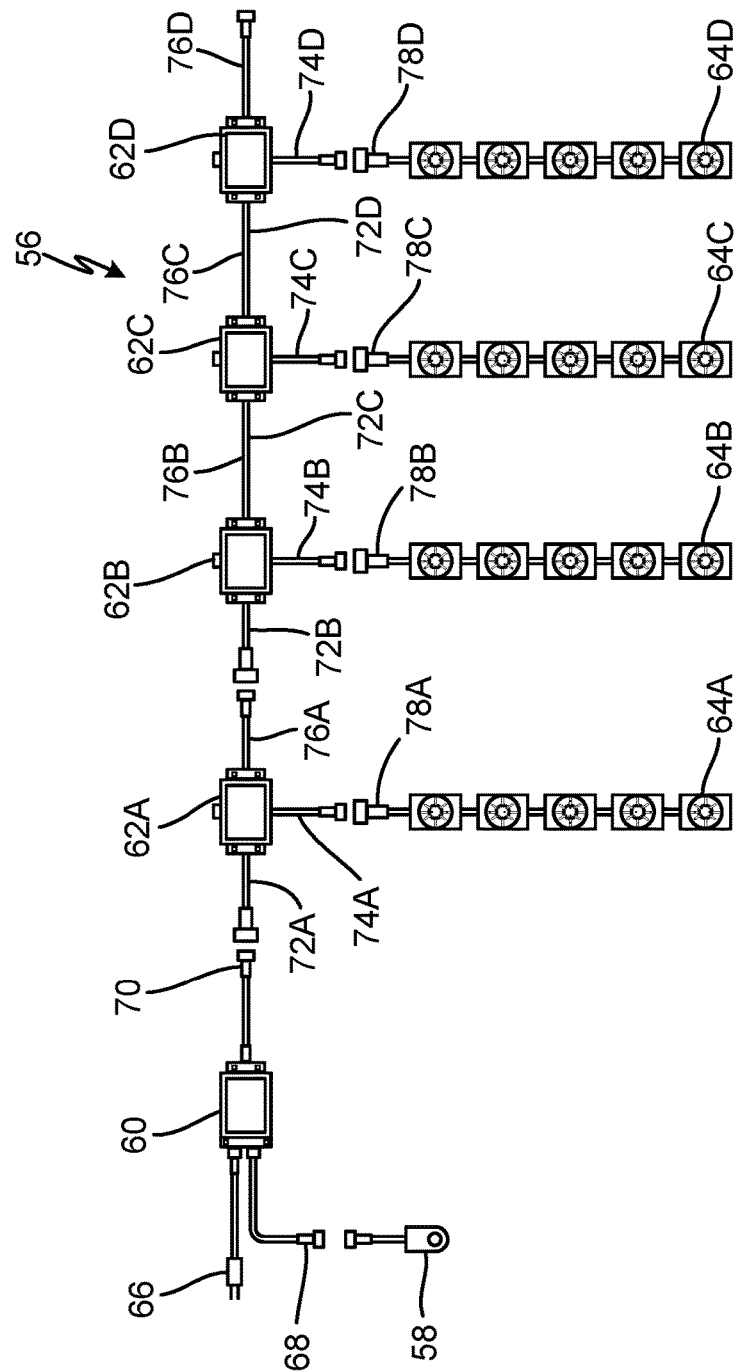
FIG. 6 is a schematic diagram of an embodiment of a curtain configured decorative lighting system.

FIG. 6 is a schematic diagram of an embodiment of a curtain configured decorative lighting system. In FIG. 6, decorative lighting system 56 includes system controller 58, power adaptor 60, light-string distribution members 62A, 62B, 62C and 62D, decorative light strings 64A, 64B, 64C and 64D. Decorative lighting system 56 is curtain configured, because decorative light strings 64A, 64B, 64C and 64D are connect in a curtain fashion to a figurative curtain rod fashioned from light-string distribution members 62A, 62B, 62C and 62D. Lighting system controller 58 generates a signal indicative of a plurality of lighting commands. For example, lighting system controller 58 can generate a signal to cause 100 lighting elements to be illuminated in a fashion in which alternating lights are of different colors. Lighting system controller 58 can cause some of the 100 lighting elements to flash on and off in a predetermined temporal fashion. Light string controller 58 can cause the 100 lights to change their colors in a temporal fashion. Lighting system controller 58 can be programmed to store and retrieve various programs of lighting shows to be used for various lighting configurations.

Power adapter 60 includes power connector 66, lighting controller connector 68 and light connector 70. In some embodiments, power adapter 60 receives AC power via power connector 66 and converts the received AC power to high-voltage DC power. The converted high-voltage DC power is provided, via light connector 70, to light-string distribution members 62A, 62B, 62C and 62D, decorative light strings 64A, 64B, 64C and 64D as operating power. In some embodiments, power adapter 60 receives, via lighting controller connector 68, the signal indicative of a plurality of lighting commands generated by lighting system controller 58. Power adapter 60 then provides the received signal indicative of a plurality of lighting commands to light-string distribution members 62A, 62B, 62C and 62D, decorative light strings 64A, 64B, 64C and 64D via lighting connector 70.

Each of light-string distribution members 62A, 62B, 62C and 62D, has conductive lead 72A, 72B, 72C and 72D, tap connector 74A, 74B, 74C and 74D and conductive tail 76A, 76B 76C and 76D, respectively. In some embodiments, conductive leads 72A, 72B, 72C and 72D and/or conductive tails 76A, 76B 76C and 76D have a connector attached thereto. In some embodiments, conductive leads 72A, 72B, 72C and 72D and/or conductive tails 76A, 76B 76C and 76D have no connector attached thereto. In such embodiments, the light-string distribution members are fixedly attached to one another.

Conductive leads 72A, 72B, 72C and 72D are each configured to connect to an upstream module of decorative lighting system 56. The upstream module is the lighting element on the power adapter side of and to which is attached light-string distribution members 72A, 72B, 72C and 72D. For example, power adapter 60 is the upstream module to which light-string distribution member 72A is connected. Light-string distribution member 72A is the upstream module to which light-string distribution member 72B is attached. Light-string distribution member 72B is the upstream module to which light-string distribution member 72C is attached. Finally, Light-string distribution member 72C is the upstream module to which light-string distribution member 62D is attached.

Conductive tails 76A, 76B, 76C and 76D are each configured to connect to a downstream module of decorative lighting system 56. The downstream module is the lighting element away from the power adapter side of light-string distribution members 72A, 72B, 72C and 72D. For example, light-string distribution member 72B is the downstream module to which light-string distribution member 72A is attached. Light-string distribution member 72C is the downstream module to which light-string distribution member 72B is attached. Light-string distribution member 72D is the downstream module to which light-string distribution member 72C is attached. Finally, Light-string distribution member 72D is not attached to a downstream module.

Each of decorative light strings 64A, 64B, 64C and 64D has a plurality of lighting elements as indicated in the drawing. Decorative light strings 64A, 64B, 64C and 64D have connectors 78A, 78B, 78C and 78D configured to connect to tap connectors 74A, 74B, 74C and 74D of light-string distribution members 62A, 62B, 62C and 62D, respectively. Each of connectors 78A, 78B, 78C and 78D is configured to connect to receive, from light-string distribution members 62A, 62B, 62C and 62D, operating power.

Each of connectors 78A, 78B, 78C and 78D is also configured to connect to receive, from light-string distribution members 62A, 62B, 62C and 62D, an input signal indicative of a plurality of lighting commands. The plurality of lighting commands includes lighting commands for each of the plurality of lighting elements of that decorative light string 62A, 62B, 62C and 62D to which it pertains as well as lighting commands for the plurality of lighting elements of decorative lights strings 62B, 62C and 62D downstream. For example, decorative light string 64C receives, via connector 78C, lighting command for itself as well as lighting commands for decorative light string 64D. Decorative light string 64B receives, via connector 78B, lighting command for itself as well as lighting commands for decorative light strings 64C and 64D. Decorative light string 64A receives, via connector 78A, lighting command for itself as well as lighting commands for decorative light strings 64B, 64C and 64D.

The plurality of lighting elements of each of decorative light strings 64A, 64B, 64C and 64D receives, via a data-in port, the input signal received by connectors 78A, 78B, 78C and 78D. In some embodiments the input signal includes a time sequence of sub-signals, each of which indicative one of the plurality of lighting commands indicated by the input signal. Each of the plurality of lighting elements responds in accordance with the lighting command indicated by the first of the received sub-signals passed thereto, and transmits, via a data-out port, the sub-signals following the first of the received lighting commands. Thus, a train of lighting commands is sequentially provide to the plurality of lighting elements, each element stripping the first sub-lighting command from the train and passing the remaining lighting commands to the lighting element coupled thereto. After the last of the series of lighting elements has received the train of lighting commands, the train of remaining lighting commands is provided, as indicated by an output signal, to connectors 78A, 78B, 78C and 78D so that light-string distribution members 62A, 62B, 62C and 62D can receive these lighting commands and provide them to the downstream module to which light-string distribution members 62A, 62B, 62C and 62D are connected.

Figure 7:
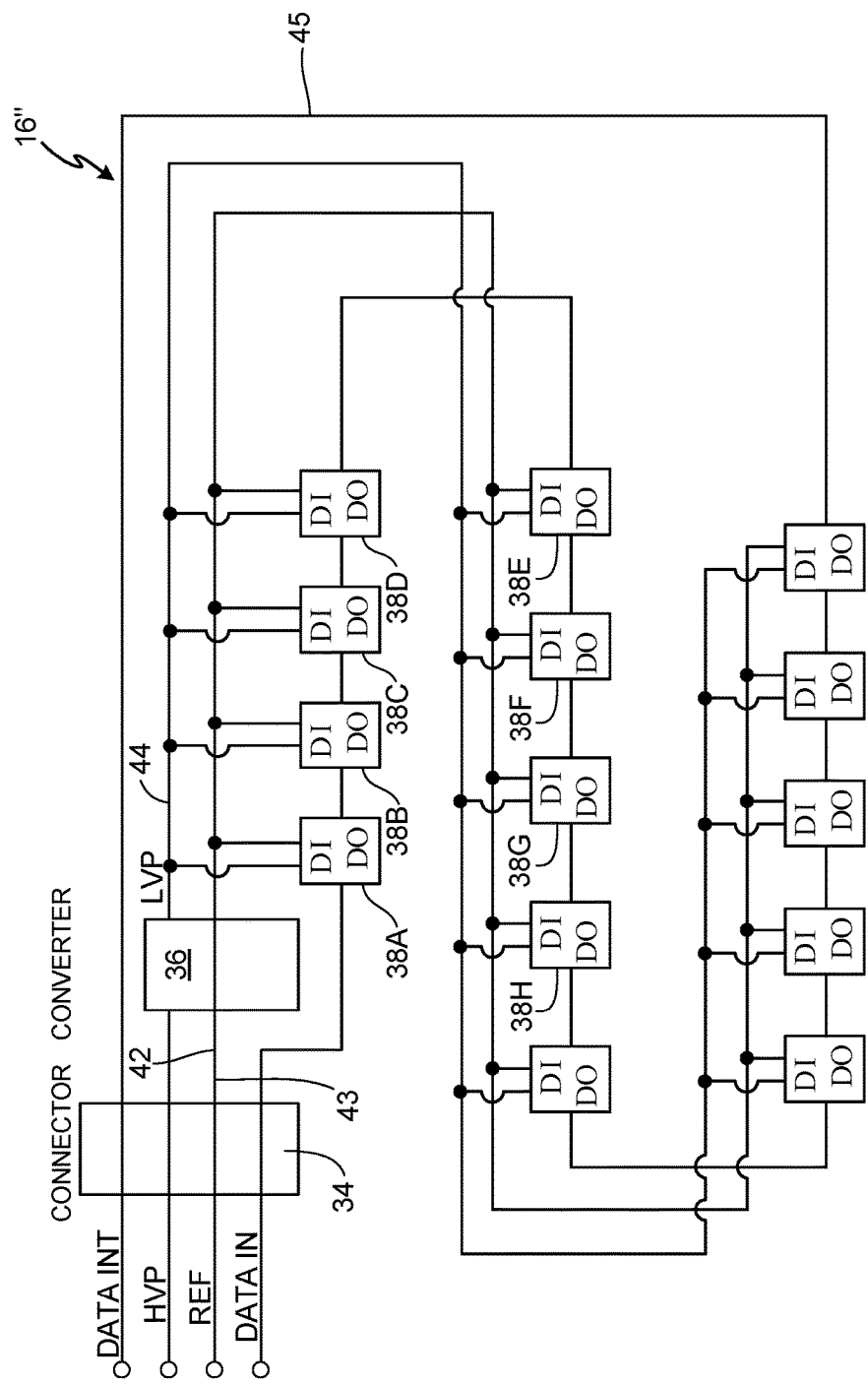
FIG. 7 is a block diagram of an embodiment of a decorative light string configured as a curtain member.

FIG. 7 is a block diagram of an embodiment of a decorative light string configured as a curtain member. In FIG. 7, decorative LED light string 16" includes connector 34, power converter 36, and lighting elements 38A-38P. Some embodiments do not have power converter 36, as such power conversion can be performed in the light-string distribution module to which decorative light string 16" is attached. Connector 34 has four contacts in the depicted embodiment. Connector 34 has contacts labeled: i) high-voltage power (HVP); ii) power reference (REF); iii) data-in; and iv) data-out. Contacts HVP and REF of connector 34 receive operating power for decorative LED light string 16". Conductors 42 and 43 provide electrical conduction of the received operating power to power converter 36.

Power converter 36 converts the received high-voltage power to a low-voltage DC power (LVP) suitable for consumption by lighting elements 38A-38P. In some embodiments, the received high-voltage power is 120 VAC line power. In such embodiments, power converter 36 converts the received 120 VAC line power to the low-voltage DC power suitable for consumption by lighting elements 38A-38P. In some embodiments, the received high-voltage power is a high-voltage DC power. For example, in an exemplary embodiment, power supply (depicted in FIG. 1) converts 120 VAC line power to high-voltage DC power by rectifying and filtering the 120 VAC line power. In such embodiments, power converter 36 converts the received high-voltage DC power to the low-voltage DC power suitable for consumption by lighting elements 38A-38P. In still other embodiments, power converter 36 is configured to convert power from other high-voltage power specifications to the low-voltage DC power suitable for consumption by lighting elements 38A-38P.

In the depicted embodiment, power converter 36 provides the low-voltage DC power suitable for consumption by lighting elements 38A-38P on conductor 44. In the depicted embodiment, the converted low-voltage DC power provided to conductor 44 is referenced to power reference REF of conductor 42. Conductors 43 and 44 provide the converted low-voltage DC power to each of lighting elements 38A-38P. In some embodiments, the converted low-voltage DC power will have an isolated reference, independent of power reference REF of conductor 43. In such embodiments, an additional conductor will provide the isolated reference voltage to lighting elements 38A-38P. In such embodiments, the additional conductor along with conductor 44 can provide the converted low-voltage DC power to each of lighting elements 38A-38P.

Lighting elements 38A-38P are identical to one another in the depicted embodiment. Lighting elements 38A-38P are wired in daisy chain fashion from the data-in contact of first connector 34 to the data-out contact of second connector 40 via data-in DI and data-out DO ports of lighting elements 38A-38P. First connector 34 receives illumination control data on the data-in contact of first connector 34. The received illumination control data can independently control the illumination of each of lighting elements 38A-38P, as well as independently controlling lighting elements of one or more decorative LED light strings attached to second connector 40. The received illumination control data may include brightness control, color control, and/or temporal control (e.g., flashing or other temporal lighting variations).

Each of daisy-chained lighting elements 38A-38P receives the illumination control data at data-in port DI. Each of daisy-chained lighting elements 38A-38P then process the received illumination control data and control the illumination based on the received illumination control data. The received illumination control data includes data corresponding to the lighting element that receives the data as well as data corresponding to lighting elements downstream the daisy chain of lighting elements from the lighting element that receives the data. Thus, each of the daisy-chained lighting elements 38A-38P transmits at least some of the received illumination data to downstream lighting elements via the data-out port DO of the lighting element. The last 38P of the lighting elements 38A-38P outputs the signal indicative of a plurality of lighting commands to conductor 45, which provides the signal indicative of a plurality of lighting commands to connector 34. Connector 34, in turn, provides the signal indicative of a plurality of lighting commands back to a light-string distribution element, to which it is attached.

Figure 8:
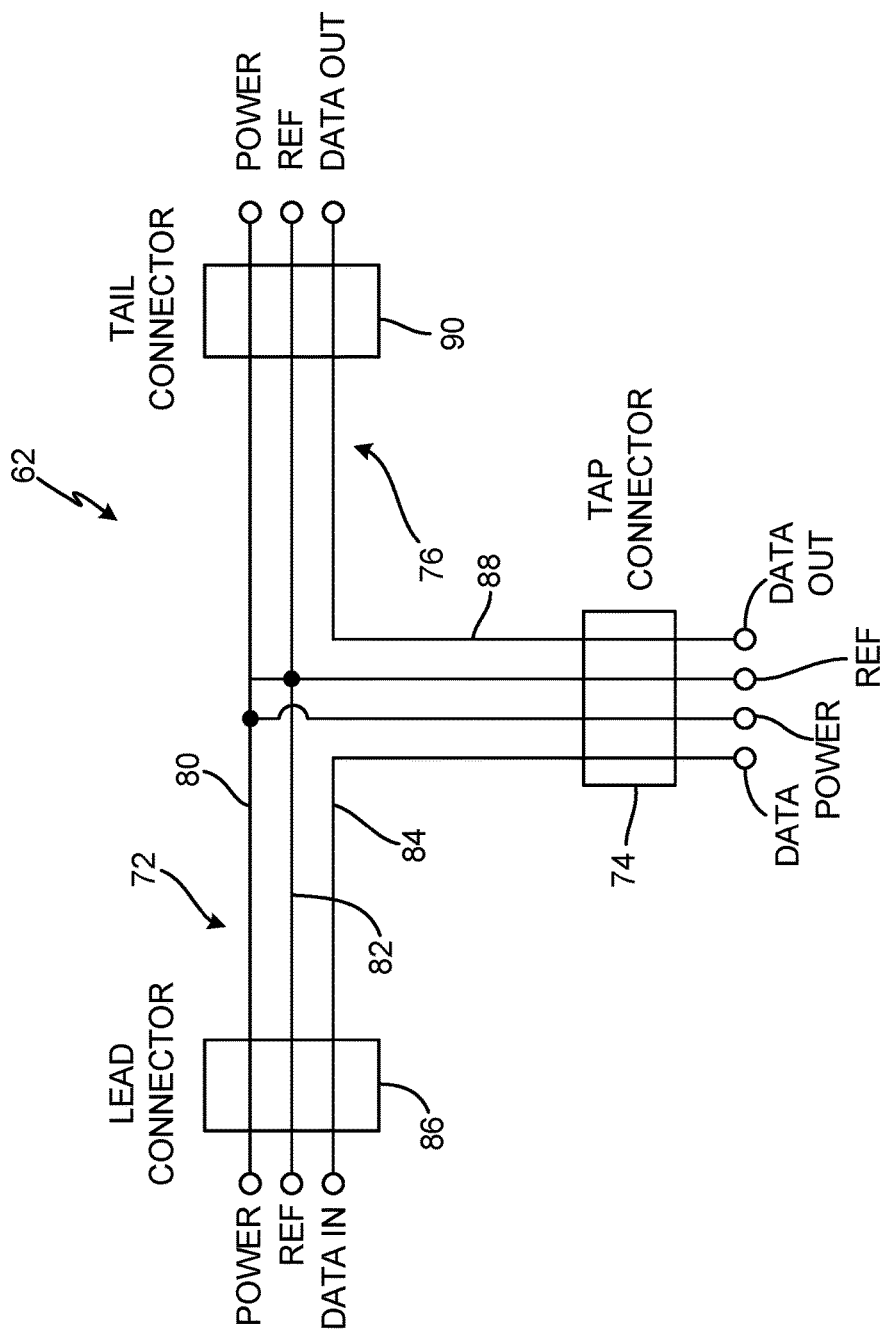
FIG. 8 is a block diagram of an embodiment of a light-string distribution member for use in a curtain configured decorative lighting system.

FIG. 8 is a block diagram of an embodiment of a light-string distribution member for use in a curtain configured decorative lighting system. In FIG. 8, light-string distribution member 62 includes conductive lead 72, tap connector 74 and conductive tail 76. In the depicted embodiment, conductive lead 72 includes three separate conductive wires—power conductor 80, reference conductor 82, and data-in conductor 84. Light-string distribution member 62 has lead connector 86 configured to releasably couple conductors 80, 82 and 84 to an upstream module of a decorative lighting system. In the depicted embodiment, conductive tail 76 includes three separate conductive wires—power conductor 80, reference conductor 82, and data-out conductor 88. Light-string distribution member 62 has tail connector 90 configured to releasably couple conductors 80, 82 and 88 to a downstream module of a decorative lighting system. Tap connector is configured to releasably couple conductors 80, 82, 84 and 88 to a decorative light string attached thereto.

Figure 9:
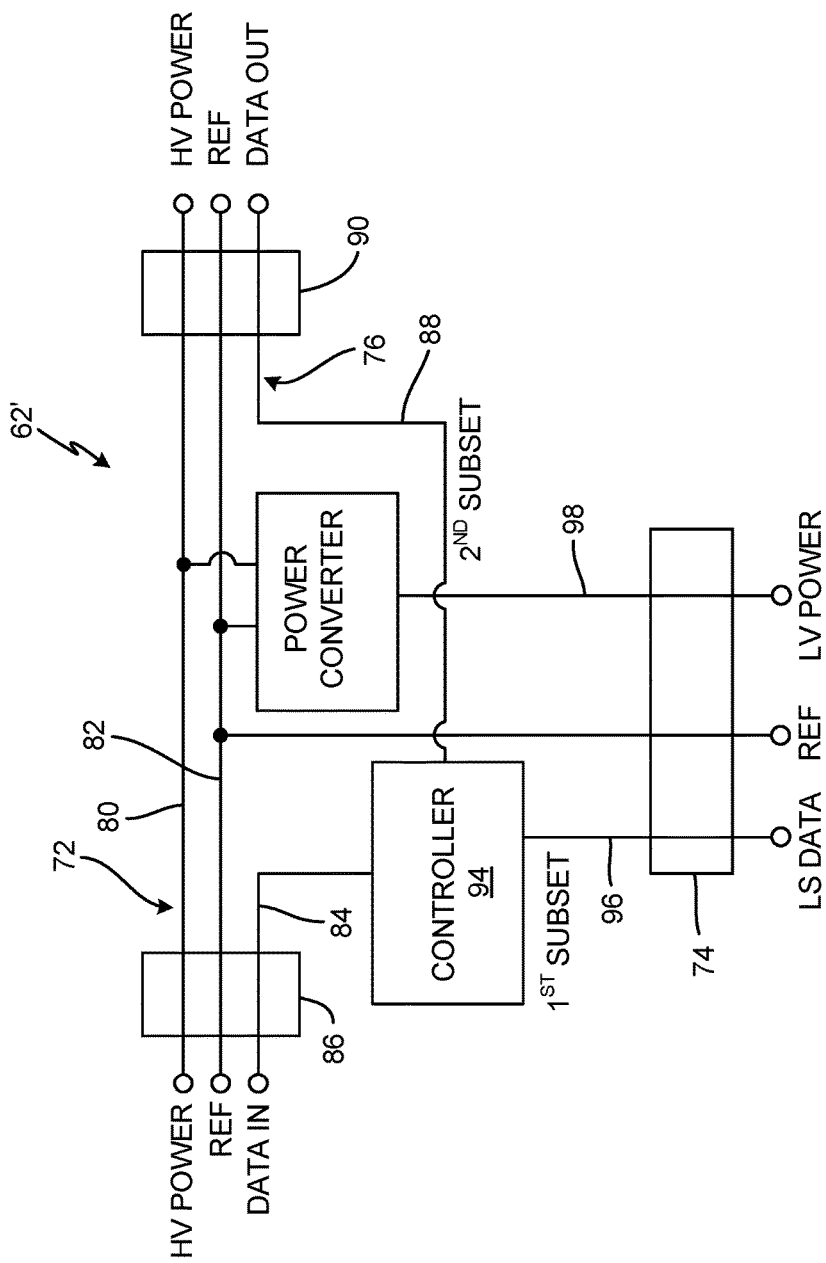
FIG. 9 is a block diagram of another embodiment of a light-string distribution member for use in a curtain configured decorative lighting system.

FIG. 9 is a block diagram of another embodiment of a light-string distribution member for use in a curtain configured decorative lighting system. In FIG. 9, light-string distribution member 62' includes conductive lead 72, tap connector 74, conductive tail 76, power converter 92, and controller 94. In the embodiment depicted, instead of providing the data-in signal, received by conductive lead 72, directly to tap connector 74, the received data-in signal is provided to controller 94. Controller 94 sends, to tap connector 74 via conductor 96, only the sub-signals of the received data-in signal that pertain to the decorative lighting element connected thereto. Controller 94 then sends, to conductive tail 76 via conductor 88, only the sub-signals of the received data-in signal that pertain to decorative lighting elements connected via conductive tail 76. The FIG. 9 embodiment also depicts power converter 92, which converts the power conducted by conductor 80 from high voltage to low voltage. Conductor 98 provides the low-voltage power to tap connector 74 via conductor 98.

Various different protocols can be used to provide both power and data to individually-controllable lighting elements of a decorative lighting system. Above is described a protocol in which power and data are communicated to individually-controllable lighting elements via separate conductors. For example, the FIG. 2 embodiment discloses a three conductor configuration having a power line, a data line, and a reference line shared by both the power and the data lines. Another protocol that can provide both power and data to individually-controllable lighting elements uses only two conductors that are both shared by the data signals and power.

Figure 10A:
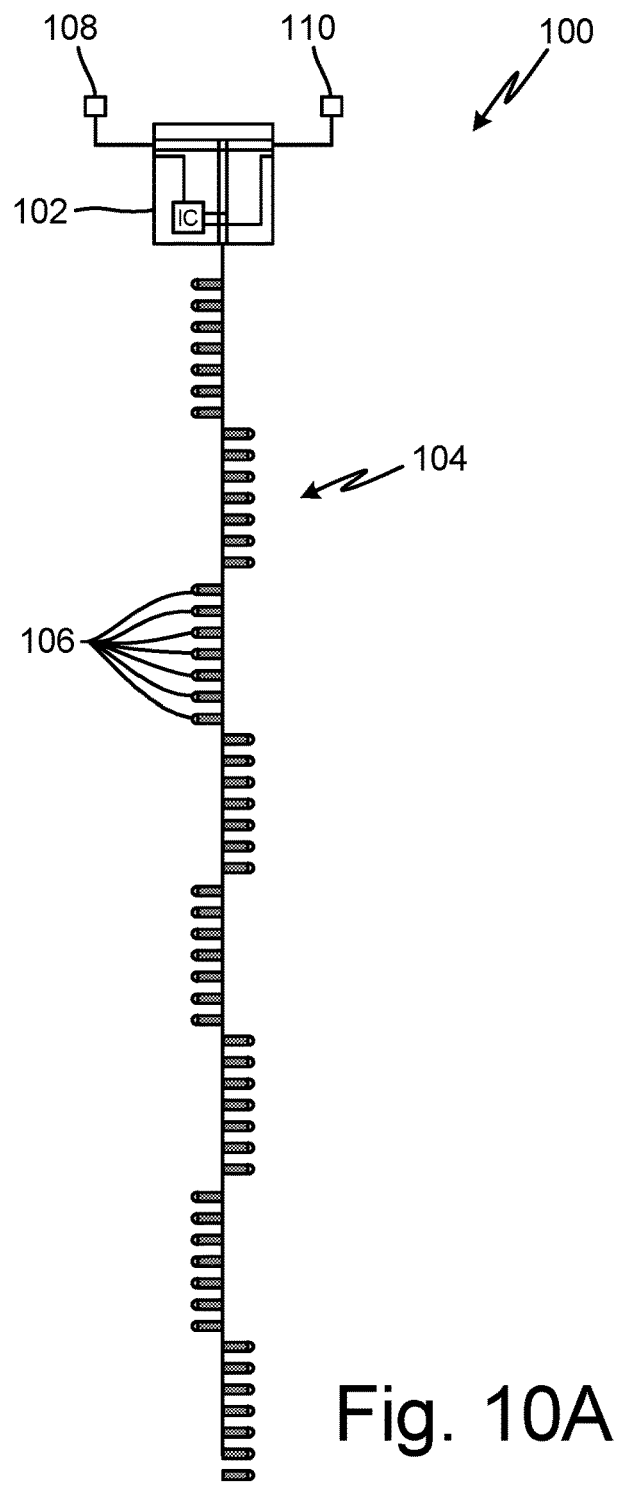
FIGS. 10A-10B are schematic diagrams of decorative lighting modules that have a data/power control for translating between different lighting protocols.
Figure 10B:
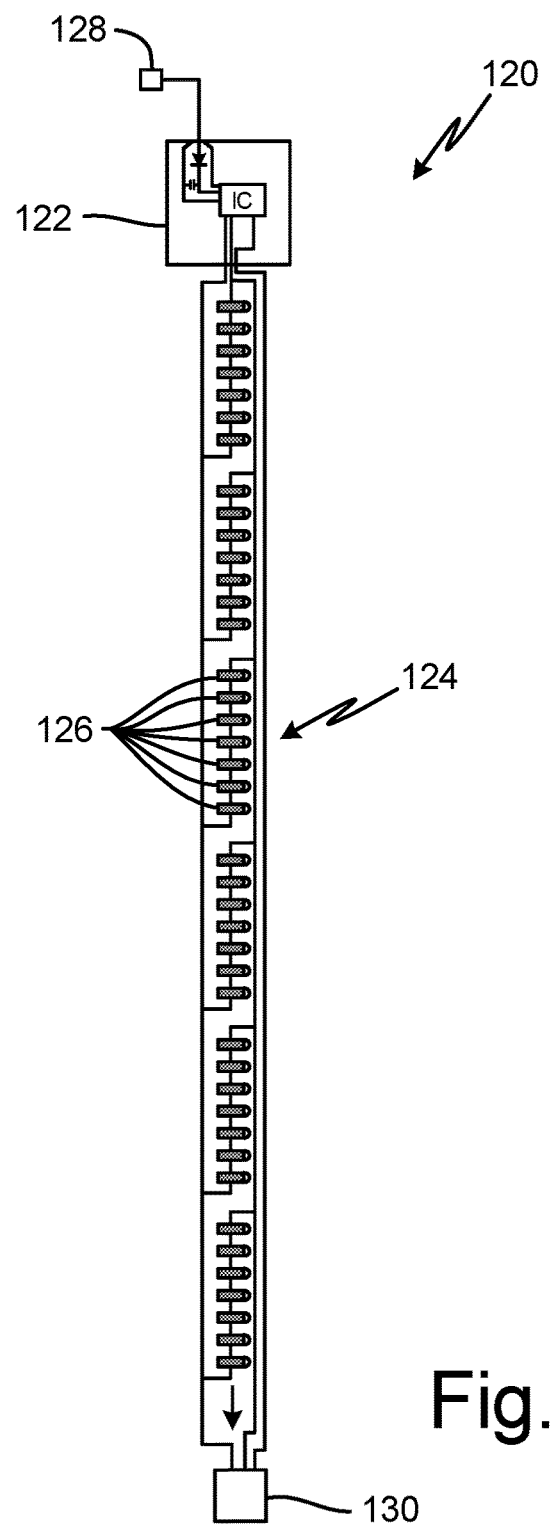

FIGS. 10A-10B are schematic diagrams of decorative lighting modules that have a data/power control for translating between different lighting protocols. FIG. 10A depicts a decorative lighting modules that has both input and output connectors on one end of the decorative lighting modules. Such decorative lighting modules can be described as an end-in-bulb light string, because the decorative lighting module is configures as a light string having both connectors at a first end and no connector at a second end. Instead of a connector at the second end, the light string ends with a lighting element (e.g., a bulb). In FIG. 10A, decorative lighting modules 100 includes data/power controller 102 and tap lighting display 104. Tap lighting display 104 includes a plurality of individually-controllable lighting elements 106, which can be wired in various fashions. In some embodiments, individually-controllable lighting elements 106 can be wired in series. In other embodiments, individually-controllable lighting elements 106 can be wired in parallel. In still other embodiments, individually-controllable lighting elements 106 can be wired in a series-parallel fashion (e.g., parallel combination of series connected subsets of the individually-controllable lighting elements). In any of these configurations, however, both power and data signals can be provided to the individually-controllable lighting elements 106 over two shared conductors. Sharing conductors can reduce the cost of decorative lighting module 100.

Data/power controller 102 includes input connector 108 and output connector 110. Input and output connectors 108 and 110 can be configured to interface, via one of the protocols for providing both power and data to individually-controllable lighting elements, with upstream and downstream modules, respectively, of a decorative lighting system. The protocols of any upstream and downstream modules connected via connectors 108 and 110 do not need to be the same protocol as is used for individually-controllable lighting elements 106 of tap lighting display 104. Data/power controller 102 is configured to translate the data signal(s) from the data/power protocol corresponding to input connector 108, and to convert the power received via input connector 108 to the date/power protocol used by individually-controllable lighting elements 106 of tap lighting display 104. In some embodiments, input and output connectors 106 and 108 can be three- or four-conductor connectors having a power line, a data line, and at least one reference line, for example. Such three- or four-conductor connectors can interface with systems described above having separate data and power lines. In other embodiments, input and output connectors 106 and 108 can be two-conductor connectors which are shared by the data signals and power.

Data/power controller 102 receives, via input connector 108, data signals for all individually controllable lighting elements of the entire decorative lighting system, which are downstream of input connector 108 (i.e., all individually controllable lighting elements 106 of tap lighting display 104 as well as those of any decorative lighting elements connected, via output connector 110, to light string 100). Data/power controller 102 identifies the data signals corresponding to tap lighting display 104 and translates the identified data signals to the data-over-power protocol used by individually-controllable lighting elements 106 of tap lighting display 104. Such a translation can include superimposing (e.g., by superposition) the data signals onto the power conductor. Data/power controller 102 also relays, to output connector 110, any data signals that correspond to individually-controllable lighting elements of any decorative lighting elements connected via output connector 110. Data/power controller 102 can remove the identified data signals corresponding to tap lighting display 104 from those received via input connector 108 and then send the data signals received via input connector 108 minus those identified data signals corresponding to tap lighting display 104 to output connector 110.

FIG. 10B depicts a decorative lighting module that has input and output connectors on opposite ends of the decorative lighting module. In FIG. 10B, decorative lighting module 120 includes data/power controller 122 and lighting display 124. Lighting display 124 includes a plurality of individually-controllable lighting elements 126, which can be wired in various fashions. In some embodiments, individually-controllable lighting elements 126 can be wired in series. In other embodiments, individually-controllable lighting elements 126 can be wired in parallel. In still other embodiments, individually-controllable lighting elements 126 can be wired in a series-parallel fashion. In any of these configurations, however, both power and data signals can be provided to the individually-controllable lighting elements 126 over two shared conductors. Sharing conductors can reduce the cost of decorative lighting module 120.

As in the FIG. 10A embodiment, data/power controller 122 includes input connector 128 and output connector 130, although in the FIG. 10B embodiment, input and output connectors are on opposite ends of decorative lighting module 120. Input and output connectors 128 and 130 can be configured to interface, via one of the protocols for providing both power and data to individually-controllable lighting elements, with upstream and downstream modules, respectively, of a decorative lighting system. The protocols of any upstream and downstream modules connected via connectors 128 and 130 do not need to be the same protocol as is used for individually-controllable lighting elements 126 of tap lighting display 124. Data/power controller 122 is configured to translate the data signal(s) from the data/power protocol corresponding to input connector 128, and to convert the power received via input connector 128 to the date/power protocol used by individually-controllable lighting elements 126 of tap lighting display 124. In some embodiments, input and output connectors 126 and 128 can be three- or four-conductor connectors having a power line, a data line, and at least one reference line, for example. Such three- or four-conductor connectors can interface with systems described above having separate data and power lines. In other embodiments, input and output connectors 106 and 108 can be two-conductor connectors which are shared by the data signals and power.

Data/power controller 122 receives, via input connector 128, data signals for all individually controllable lighting elements of the entire decorative lighting system, which are downstream of input connector 128 (i.e., all individually controllable lighting elements 126 of tap lighting display 124 as well as those of any decorative lighting elements connected, via output connector 130, to light string 120). Data/power controller 122 identifies the data signals corresponding to tap lighting display 124 and translates the identified data signals to the data-over-power protocol used by individually-controllable lighting elements 126 of tap lighting display 124. Such a translation can include superimposing (e.g., by superposition) the data signals onto the power conductor.

Data/power controller 122 also relays, to output connector 130, any data signals that correspond to individually-controllable lighting elements of any decorative lighting elements connected via output connector 130. Data/power controller 122 can remove the identified data signals corresponding to tap lighting display 124 from those received via input connector 108 and then send the data signals received via input connector 128 minus those identified data signals corresponding to tap lighting display 124 to output connector 130. Because output connector 130 and input connector 128 are on opposite ends of decorative lighting module 120, an additional conductor traverses lighting display 124 than traverses lighting display 104 depicted in FIG. 10A. This additional conductor communicates either the data/power corresponding to lighting display 124 or data/power sent to output connector 130, depending on where data/power controller 122 is located.

Figure 11:
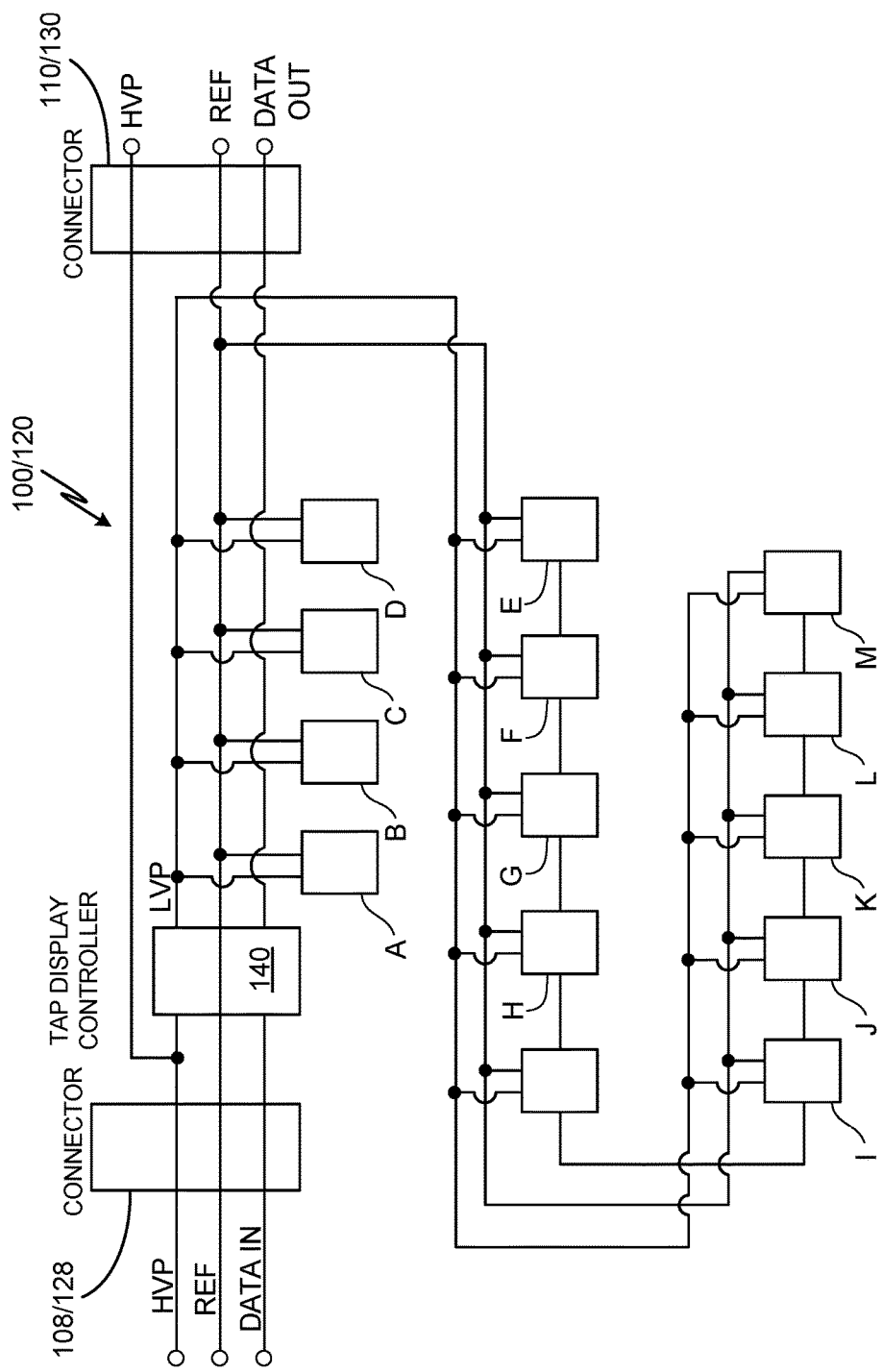
FIG. 11 is a block diagram of an embodiment of a decorative lighting module having a data/power controller.

FIG. 11 is a block diagram of an embodiment of a decorative lighting module having a data/power controller. In FIG. 11, decorative lighting module 100/130 includes data/power controller 102/122 and lighting display 104/124. Decorative lighting module 100/130 can represent either decorative lighting module 100 depicted in FIG. 10A or decorative lighting module 120 depicted in FIG. 10B, depending on the relative locations of input and output connectors 108/128 and 110/130. If, for example, input and output connectors 108/128 and 110/130 are located on the same end of decorative lighting module 100/130, with respect to lighting display 104/124, then the FIG. 11 embodiment represents decorative lighting module 100 depicted in FIG. 10A. If, however, input and output connectors 108/128 and 110/130 are located on opposite ends of decorative lighting module 100/130, then the FIG. 11 embodiment represents decorative lighting module 120 depicted in FIG. 10B.

Input connector 108/128 is configured to releaseably connect to an upstream module of the decorative lighting system. Input connector 108/128 is further configured to receive, from the upstream module connected thereto, operating power. Input connector 108/128 is also configured to receive, from the upstream module connected thereto, an input signal including a plurality of command signals, each configured to cause a specific one of individually-controllable lighting elements A-M of decorative lighting module 100/120 to illuminate in a specific manner indicated by the lighting command.

Data/power controller 102/122 includes tap display controller 140, which translates the data/power from the protocol corresponding to how data and power are received by input connector 108/128 to the two-wire protocol corresponding to tap lighting display 104/124. In the embodiment depicted in FIG. 11, individually-controllable lighting elements A-M are wired in parallel, receiving both operating power and data from conductors 140 and 142. In other embodiments, individually-controllable lighting elements A-M can be wired in series or in a series-parallel fashion. Tap display controller 140 is configured to provide operating power to conductors 140 and 142, which are conductively coupled to a tap lighting display 104/124 connected thereto. Tap display controller 140 is further configured to provide a tap signal to conductors 140 and 142, so as to superimpose the tap signal onto the provided operating power. The tap signal includes a first subset of the plurality of command signals corresponding to one or more individually-controllable lighting element(s) of the tap lighting display connected thereto.

In some embodiments, data/power controller 102/122 can have a tap connector conductively coupled to the pair of conductors and configured to releaseably connect to tap lighting display 104/124.

In some embodiments, the tap signal indicative of a first subset of the plurality of lighting commands can be a time sequence of signals, each having an address and a command corresponding to one of individually-controllable lighting elements A-M of the tap lighting display 104/124.

In some embodiments, the input signal indicative of a first subset of the plurality of lighting commands can be a time sequence of signals, each having an address and a command corresponding to one of a plurality of individually-controllable lighting elements of the decorative lighting system.

In some embodiments, the input signal including a plurality of command signals can be a time sequence of the command signals, each having an index corresponding to its relative time location within the time sequence, wherein each index corresponds to a specific one of the plurality of lighting elements of the decorative light system.

In some embodiments, tap display controller 140 can be further configured to generate the output signal by removing a first predetermined number of the time sequence of commands from the input signal.

In some embodiments, tap display controller 140 can be further configured to select a first predetermined number of the time sequence of commands from the input signal. Tap display controller 140 can also be configured to assign, to the selected time sequence of signals, addresses corresponding to the indices of the selected time sequence of commands In some embodiments, the first and second subsets of lighting commands can be mutually exclusive of one another.

In some embodiments, the operating power received via the input conductor can be a high-voltage operating power having a voltage greater than 48 volts.

In some embodiments, the operating power provided to the one or more controllable lighting elements can be a low-voltage operating power having a voltage less than 48 volts.

Output connector 110/130 is configured to releasably connect to a downstream module of the decorative lighting system. Output connector 110/130 is further configured to provide, to the downstream module connected thereto, the operating power received by the input connector. Output connector 110/130 is also configured to provide, to the downstream module, an output signal including a second subset of the plurality of command signals corresponding one or more individually-controllable lighting element(s) of an output lighting display connected via the output connector.

Figure 12:
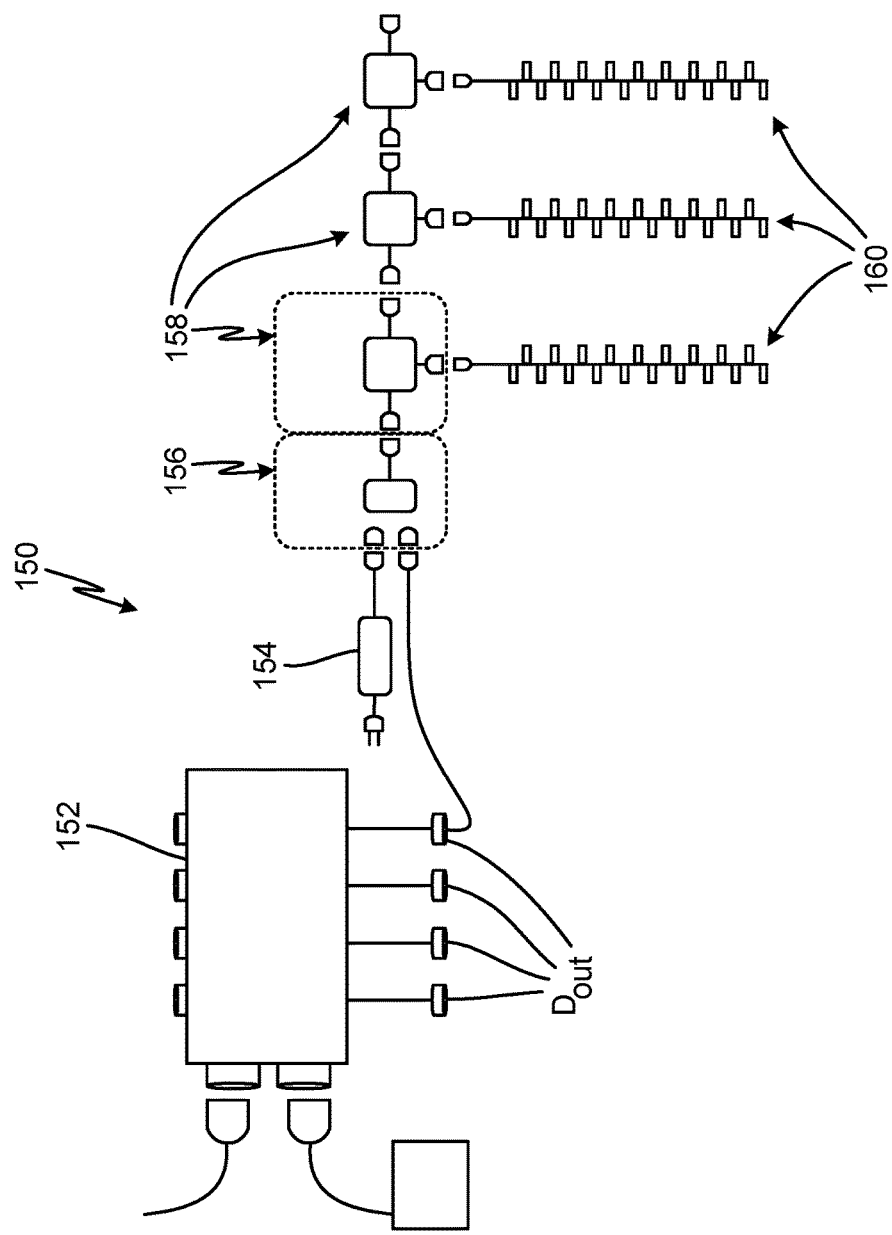
FIG. 12 depicts an embodiment of a decorative lighting system that has an assortment of lighting modules.

FIG. 12 depicts an embodiment of a decorative lighting system that has an assortment of lighting modules. In FIG. 12, decorative lighting system 150 includes master control unit 152, power source 154, data/power source 156, data/power tap controllers 158, and end-in-bulb light strings 160. Master control unit 152 receives, from a wired or wireless source, and/or retrieves from memory a plurality of command signals, each configured to cause a specific one of the individually-controllable lighting elements of the decorative lighting system. Master control unit 152 then generates a control signal indicative of the received or retrieved plurality of command signals, and provides the generated control signal to one or more output ports $D_{OUT}$.

Power source 154 can be a 120 Volt AC source, a high-voltage DC source (e.g., >48 VDC), a low-voltage DC source (e.g., 24 VDC), a solar cell, etc. Data/power source 156 receives power from power source 154 and the control signal provided by master control unit 152.

Data/power source 156 then generates data signals and power according to a decoratively lighting data/power protocol. In some embodiments, data signals and power can be generated according to one or more of the protocols disclosed above. Data/power tap controller 158 receives data signals and power at an input connector, translates the receive data signal and power according to a protocol of the end-in-bulb light string 160 attached thereto. In some embodiments, data/power tap controller 158 can provides a data signal to the tap connector that only has command signals corresponding to individually-controllable lighting elements of the decorative lighting system that are connected via the tap connector.

Data/power tap controller 158 then provides the translated data signal and power to the tap connector. Data/power tap controller 158 also provides a data signal and power to an output connector. In some embodiments, data/power tap controller 158 can provides a data signal to the output connector that only has command signals corresponding to individually-controllable lighting elements of the decorative lighting system that are connected via the output connector.

Figure 13:
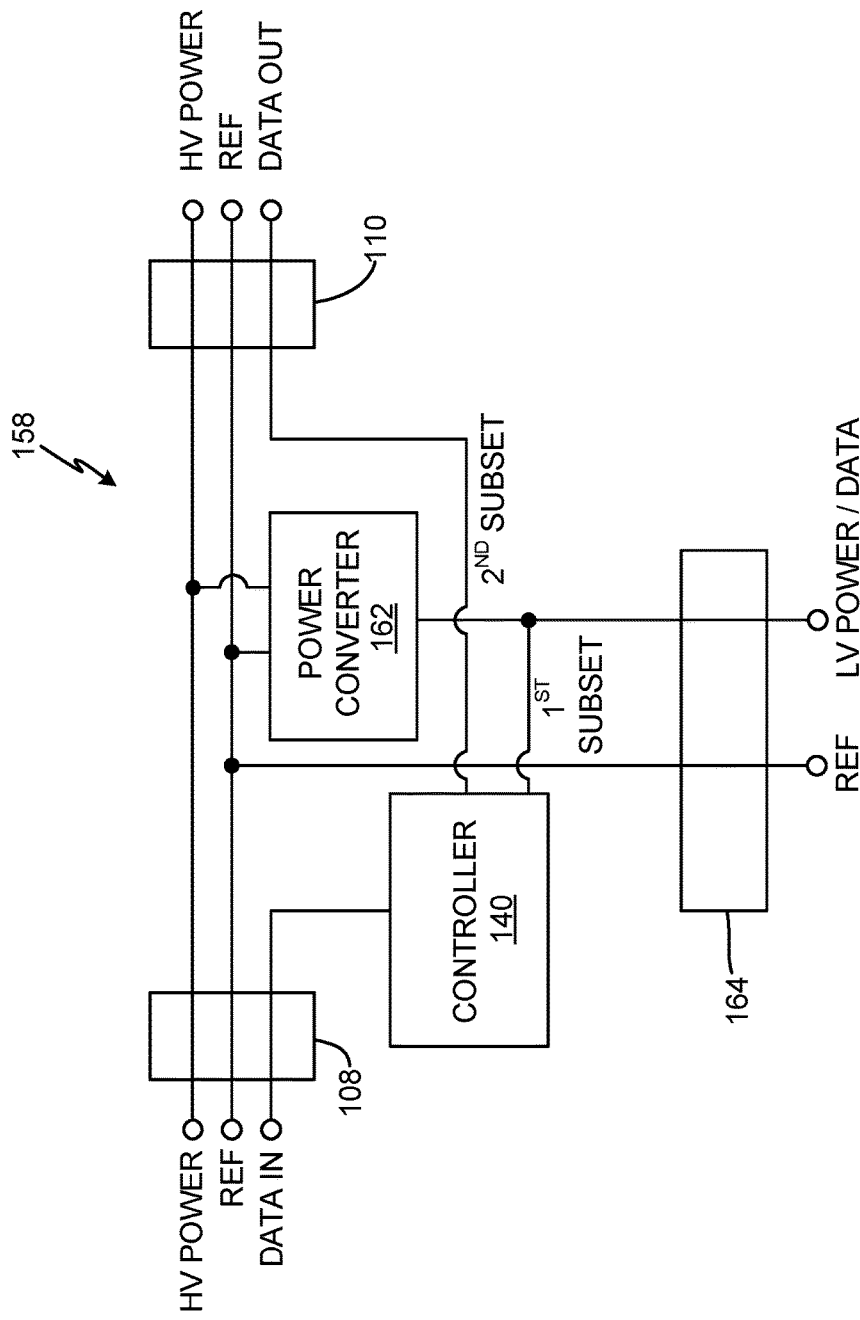
FIG. 13 is an embodiment of a data/power tap controller.

FIG. 13 is an embodiment of a data/power tap controller. In FIG. 13, data/power tap controller 158 includes input connector 108, output connector 110, tap display controller 140, power controller 162, and tap connector 164. In the depicted embodiment, input and output connectors 108 and 110 have three conductors, while tap connector 164 has two conductors, which indicates that the data/power protocol received by and supplied to input and output connectors 108 and 110, respectively, is different that the data/power protocol supplied to tap connector 164. Input and output connectors 108 and 110 have separate data and power lines sharing a common reference line. Tap connector 164 has a reference line and a shared data/power line.

Figure 14:
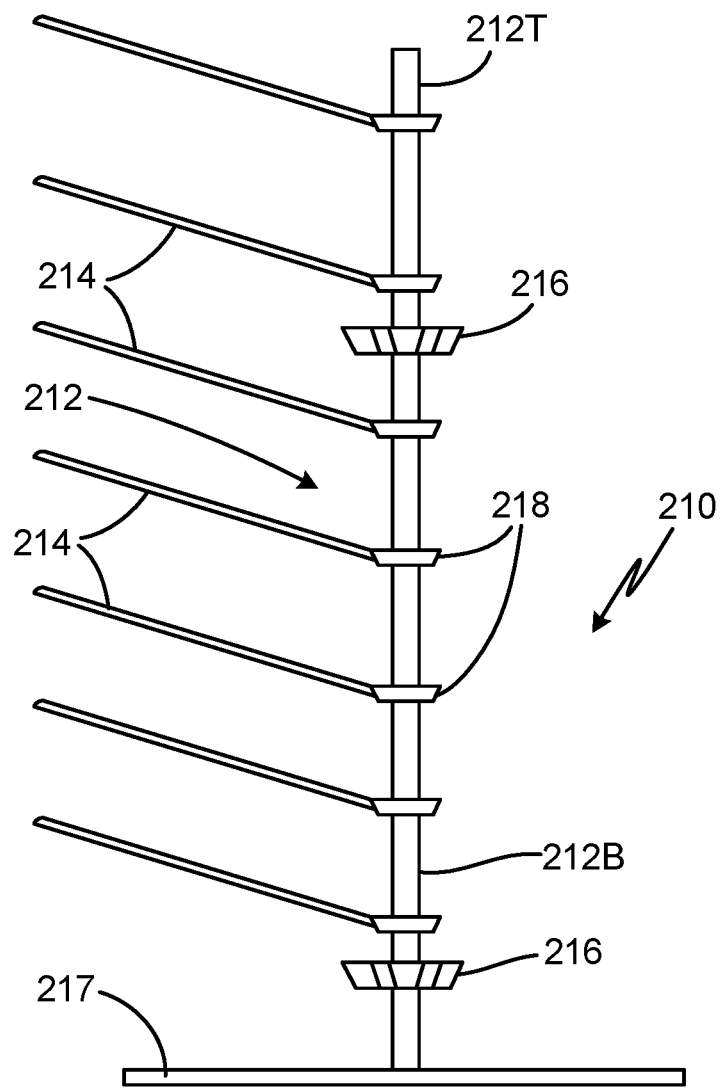
FIG. 14 is a side elevation view of a skeleton of a stowable tree in a deployed state.

FIG. 14 is a side elevation view of a skeleton of a stowable tree in a deployed state. In FIG. 14, skeleton 210 of a decorative tree (without depicting various foliage and other branch members, etc.) includes column or trunk 212, pivotable branches or branch segments 214, nesting cups 216, and base or mount 217. Skeleton 210 can be a whole of a decorative tree or a portion, such as a bottom section of a multi-part tree. In some embodiments, a decorative tree includes two sections, for example. Column or trunk 212 includes top column or trunk segment 212T which slidably nests within bottom column or trunk segment 212B, when stowed. Column 212 is configured to have two stable states or modes—a deployed mode, and a stowed mode. When in the deployed mode, top column 212T slidably retracts from it stowed position within bottom column 212B, so as to extend therefrom. Top column 212T is maintained in the deployed state via a mechanism, such as a spring and/or latch. In the deployed state, pivotable branches 214 extend laterally from column 212 so as to be in a gravity-maintained deployed condition. A range of pivot for each of pivotable branches 214 is limited so as to laterally project pivotable branches 214 from column 212 at a predetermined pivot angle, when in the deployed mode. For example, a pivot blocking mechanism, such as a stop or block, can be used to limit the range of pivot of each of pivotable branches 214. Each of pivotable branches 214 is attached to one of sliding rings 218. Sliding rings are connected one to another via a separation limiting cable or cord, so that sliding rings are maintained at a predetermined separation distance when in the deployed condition.

Figure 15:
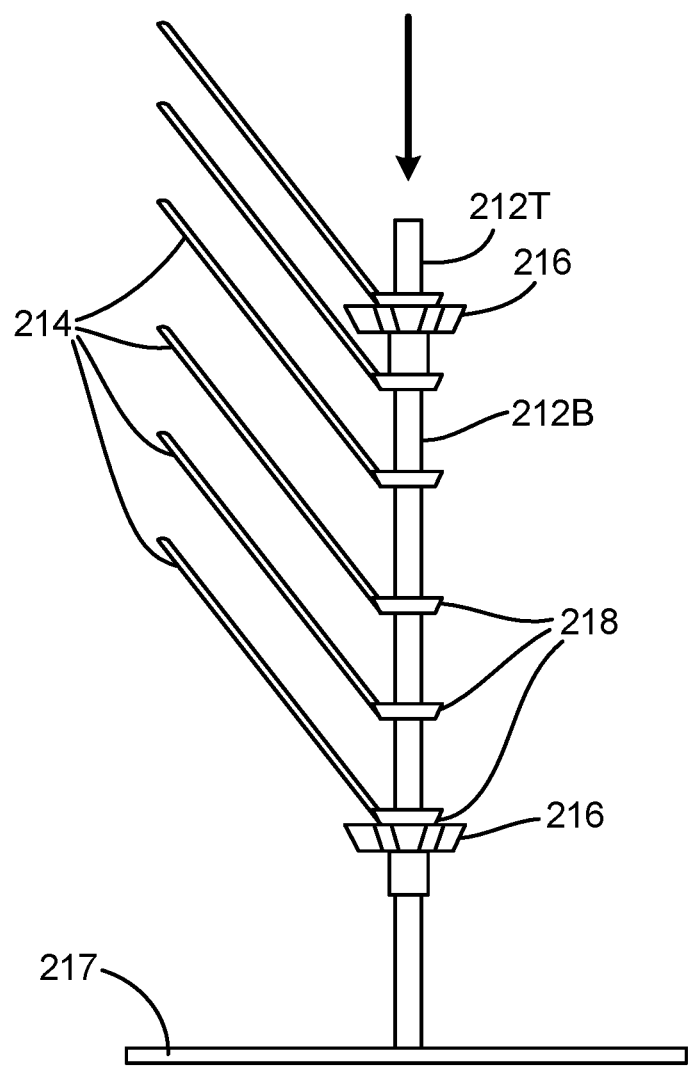
FIG. 15 is a side elevation view of a skeleton of a stowable tree being compressed to a stowed state.

FIG. 15 is a side elevation view of a skeleton of a stowable tree being compressed to a stowed state. In FIG. 15, skeleton 210, depicted in deployed mode in FIG. 15 is depicted in stowed mode. Top column 212 is slidable nested within bottom column 212B, thereby shortening an axial length of column 212. A user can compress top column 212 by disengaging a latching mechanism and/or by pressing down on top column 212, thereby providing a counter force against a spring member, for example. In some embodiments a motor mechanism can be used to deploy and/or stow skeleton 210. When in the stowed mode, a separation distance between sliding rings 218 can be reduced below the predetermined separation distance between such sliding rings in the deployed mode. Nesting cups 216 can be shaped so as to force pivotable branches 214 to pivot in an upward direction. Pivotable branches 214 can, in domino fashion, force pivotable branches 214 adjacently connected to pivot upward. Pivotable branches 214 can be pivoted upward so as to reduce an angle between column 212 and pivotable branches 214, thereby reducing an extent of radial projection. Similar to the deployed condition, top column 212T can be maintained in the stowed state via a mechanism, such as a spring and/or latch.

Figure 16:
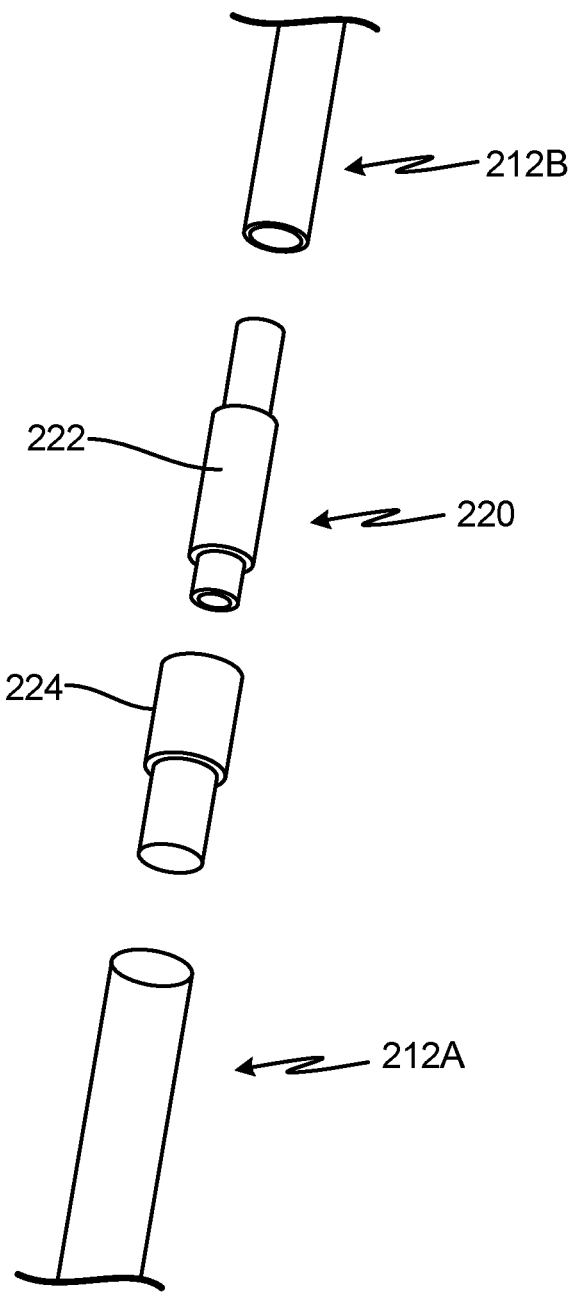
FIG. 16 is a perspective view of an axial tree connector configured to distribute power to a decorative tree.

FIG. 16 is a perspective view of an axial tree connector configured to distribute power to a decorative tree. In FIG. 16, an embodiment of axial connector 220 includes top member 222 and bottom member 224. Axial connector 220 is configured to connect two compressible sections 212A and 212B of a stowable tree, such as the one depicted in FIGS. 14 and 15. Top member 222 is configured to slideably engage both top section 212A and bottom member 224. Bottom member 224 is configured to slideably engage both bottom section 12B and top member 222. Top and bottom members 222 and 224 are configured to both mechanically engage with one another and to provide a power connection therebetween when mechanically engaged. As will be depicted in FIGS. 18-19 below, power will be routed to and from top and bottom members 222 and 224 via electrical wires radially connected thereto. The electrical wires radially connected to each of top and bottom members 222 and 224 are electrically connected one to another via the mechanical engagement of top and bottom members 222 and 224. Such electrical connection can be an axial connection, for example.

Figure 17:
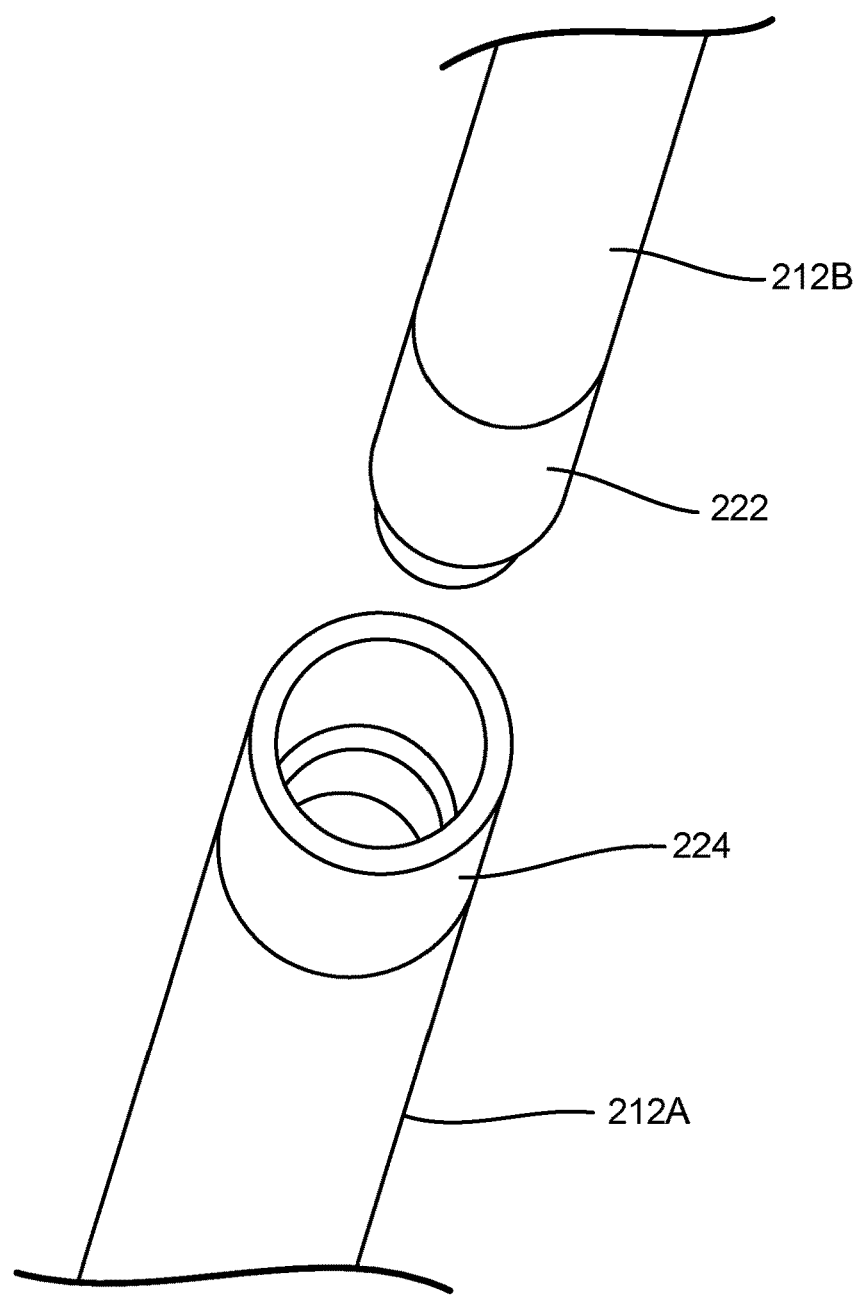
FIG. 17 is a perspective close-up view of an axial tree connector configured to couple power between two sections of a decorative tree.

FIG. 17 is a perspective close-up view of an axial tree connector configured to couple power between two sections of a decorative tree. FIG. 17 depicts the sections shown in FIG. 16, but with top member 222 engaged with top section 212A and with bottom member 224 engaged with bottom section 212B. Top section 212A can then be axially coupled to bottom section 212B by axial engagement of top member 222 with bottom member 224.

Figure 18:
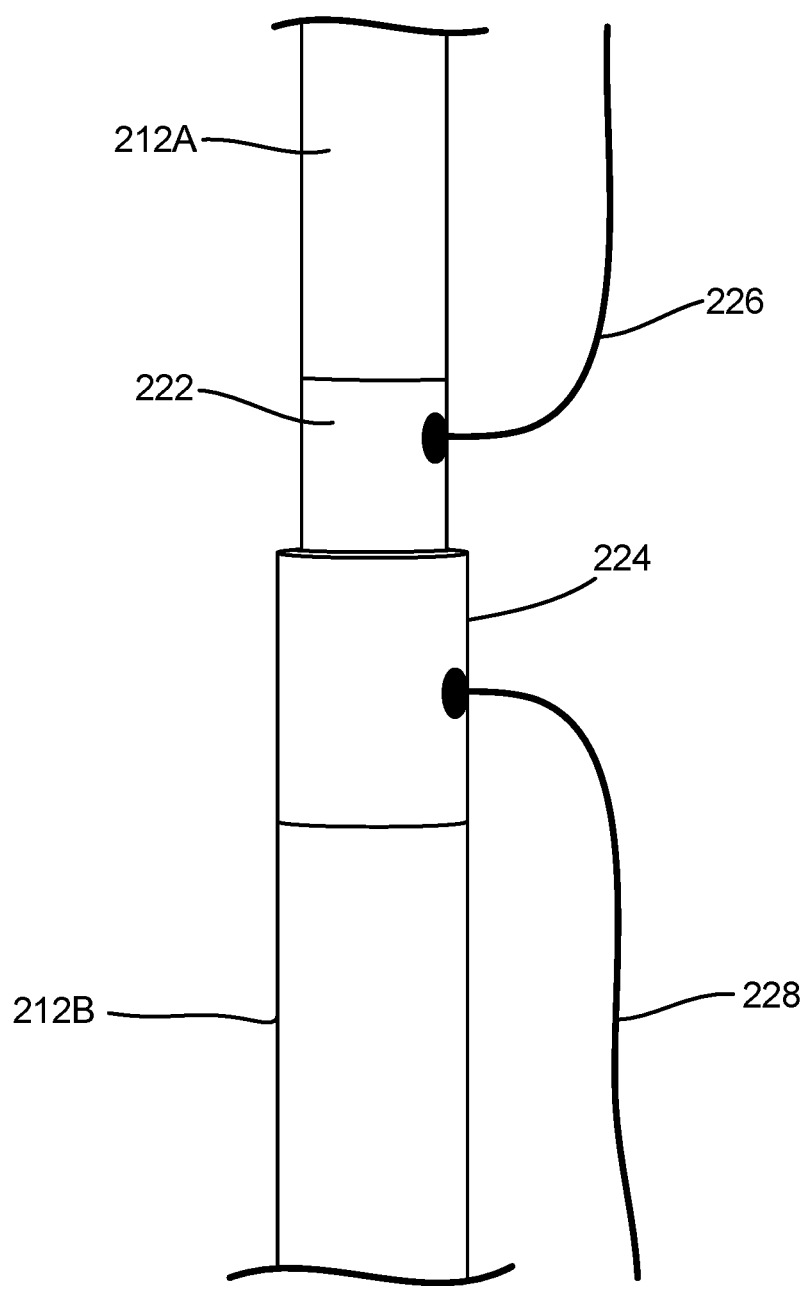
FIG. 18 is a side elevation view of an axial connector with power distribution exterior to the tree column.

FIG. 18 is a side elevation view of an axial connector with power distribution exterior to the tree column. In FIG. 18, electrical wires 226 and 228, which form a trunk electrical distribution network, are shown providing power to top member 222 and bottom member 224, respectively. Electrical wires 226 and 228 are in conductive communication with one another via connection of top and bottom members 222 and 224. Electrical wire 226 can have one or more connectors coupled thereto and configured to provide electrical power to one or more light strings and/or lighted ornaments connected thereto. Electrical wire 226, emanating from top section 212A is favorably located so as to provide power to decorative light strings and/or lighted ornaments hung from pivotable branches 214 connected to slidable rings 218 of top section 212A. Electrical wire 226 can have one or more connectors coupled thereto and configured to provide electrical power to one or more light strings and/or lighted ornaments connected thereto.

Electrical wire 228 can have one or more connectors coupled thereto and configured to provide electrical power to one or more light strings and/or lighted ornaments connected thereto. Electrical wire 228, emanating from bottom section 212B is favorably located so as to provide power to decorative light strings and/or lighted ornaments hung from pivotable branches 214 connected to slidable rings 218 of bottom section 212B. Electrical wire 228 can have one or more connectors coupled thereto and configured to provide electrical power to one or more light strings and/or lighted ornaments connected thereto. Electrical wire 228 can have a connector configured to connect to a power outlet so as to receive operating power for the decorative tree.

Figure 19:
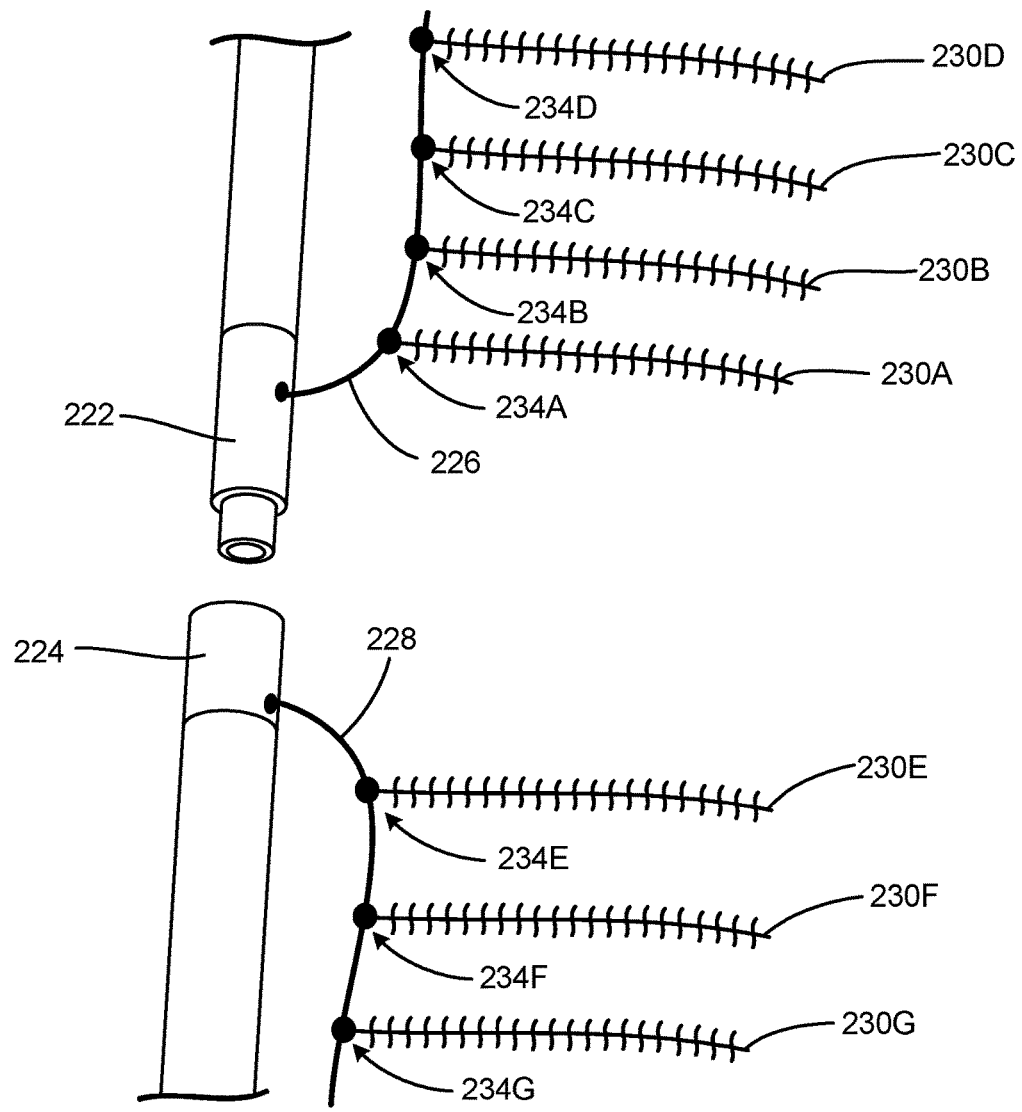
FIG. 19 is a perspective view of power distribution to decorative light strings via an axial tree connector.

FIG. 19 is a perspective view of power distribution to decorative light strings via an axial tree connector. In FIG. 19 top wire 226 is shown connected to light strings 230A, 230B, 230C and 230D, each of which include a branch electrical distribution network and one or more lighting elements. Electrical wire 226 can be fixedly or removeably connected to light strings 2230A, 230B, 230C and 230D. For example, in one embodiment, electrical wire 226 has a series of power connectors to which decorative light strings 230A, 230B, 230C, and 230D are connected. In another embodiment, electrical wire 226 is fixedly attached to decorative light strings 230A, 230B, 230C, and 230D. In some embodiments, light strings 230A, 230B, 230C, and 230D are fixedly coupled to pivotable branches 214 of top section 212A. In other embodiments, light strings 230A, 230B, 230C, and 230D can engage non-pivotable branches of an artificial tree.

In some embodiments, top wire 226 part of a trunk electrical distribution system that engages trunk segment 224 and includes an electrical connector 232 (shown in FIG. 20) conductively coupled to top wire 226. Top wire 226 can be a multi-conductor wire. Electrical connector 224 can have a plurality of electrical contacts configured to couple to a complementary electrical connector so as to receive operating power therefrom. Multi-conductor wire 226 can be configured to conductively provide thereon both the operating power received by electrical connector 224 and a plurality of lighting control signals.

Each of light strings 230A, 230B, 230C, and 230D can be called a branch electrical distribution system. In some embodiments, each of light strings 230A, 230B, 230C, and 230D can be a curtain configured light string such as decorative light string 16" depicted in FIGS. 6 and 7, or such as end-in-bulb light strings 160 depicted in FIG. 12.

Each branch electrical distribution system 230A, 230B, 230C and 230D can engage to a corresponding branch segment, whether it is pivotable or non-pivotable. Each of light strings 230A, 230B, 230C, and 230D can have a two-conductor wire configured to receive, from the trunk electrical distribution system, both operating power and at least a subset of the plurality of lighting control signals. Each of light strings 230A, 230B, 230C, and 230D can also have a plurality of independently-controllable lighting elements, each disposed along its length, and each conductively coupled to the two-conductor wire of the branch electrical distribution system to which it engages. Each independently-controllable lighting element can have a local controller configured to control illumination by providing, in response to a corresponding one of the subset of the plurality of lighting control signals provided thereto via the two-conductor wire of the branch electrical distribution system, a controlled illumination of the independently controllable lighting element.

Electrical wire 228 can be fixedly or removeably connected to light strings 230E, 230F and 230G as indicated at taps 234E, 234F and 234G. For example, in one embodiment, taps 234E, 234F and 234G of electrical wire 28 has a series of power connectors to which decorative light strings 230E, 230F and 230G can be removably connected. In another embodiment, of electrical wire 228 is fixedly attached to decorative light strings 230E, 230F and 230G via taps 234E, 234F and 234G. In still other embodiments, taps 234E, 234F and 234G can be one of the various light-string distribution members 62, 62' depicted in FIGS. 8 and 9, respectively or can be data/power tap controllers 158 as depicted in FIG. 12. In some embodiments, the light strings are fixedly coupled to pivotable branches 214 of bottom section 212B.

Figure 20:
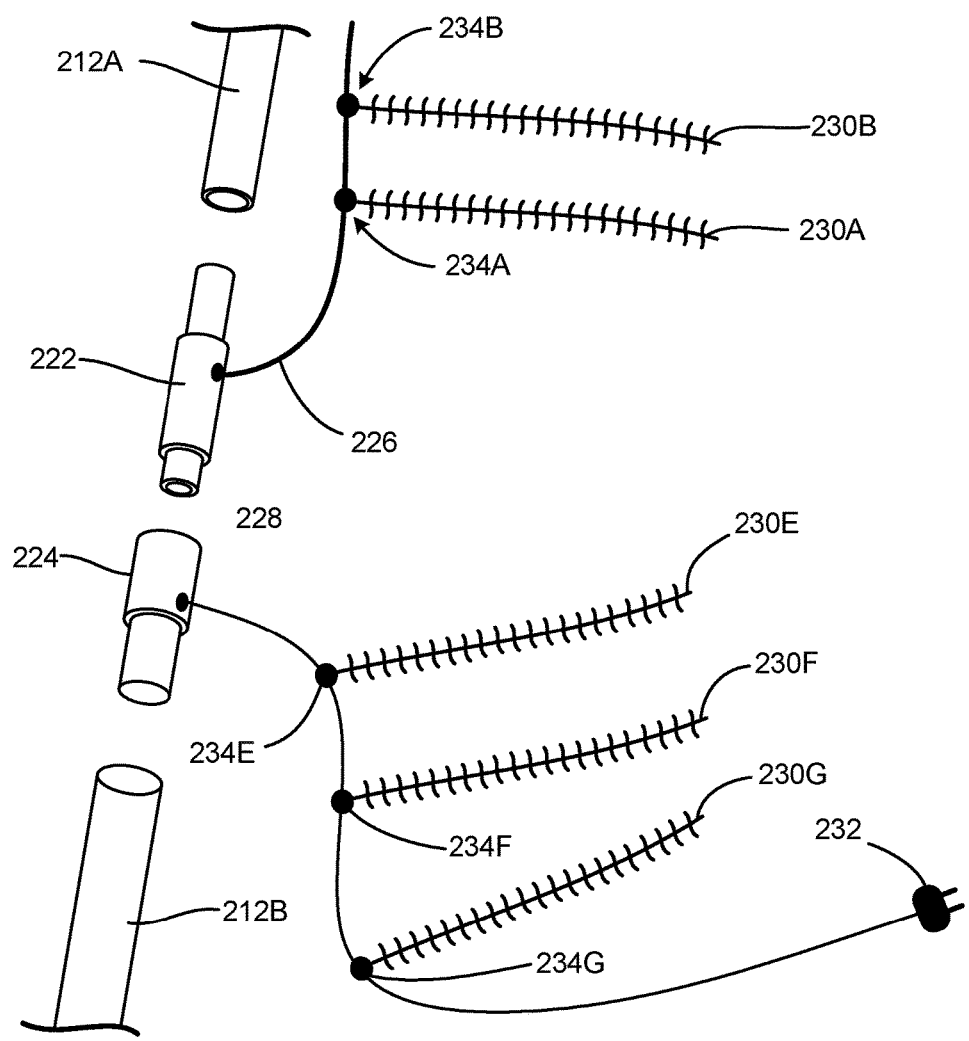
FIG. 20 is a perspective exploded view of power distribution to decorative light strings via an axial tree connector.

FIG. 20 is a perspective exploded view of power distribution to decorative light strings via an axial tree connector. FIG. 20 is an exploded view of FIG. 19. In FIG. 20, it is clear that no power is run on the interior of columns 212A and 212B. Electrical wire 228 of bottom member 224 is depicted with power connector 232, which is configured to connect to a standard power outlet.

Figure 21:
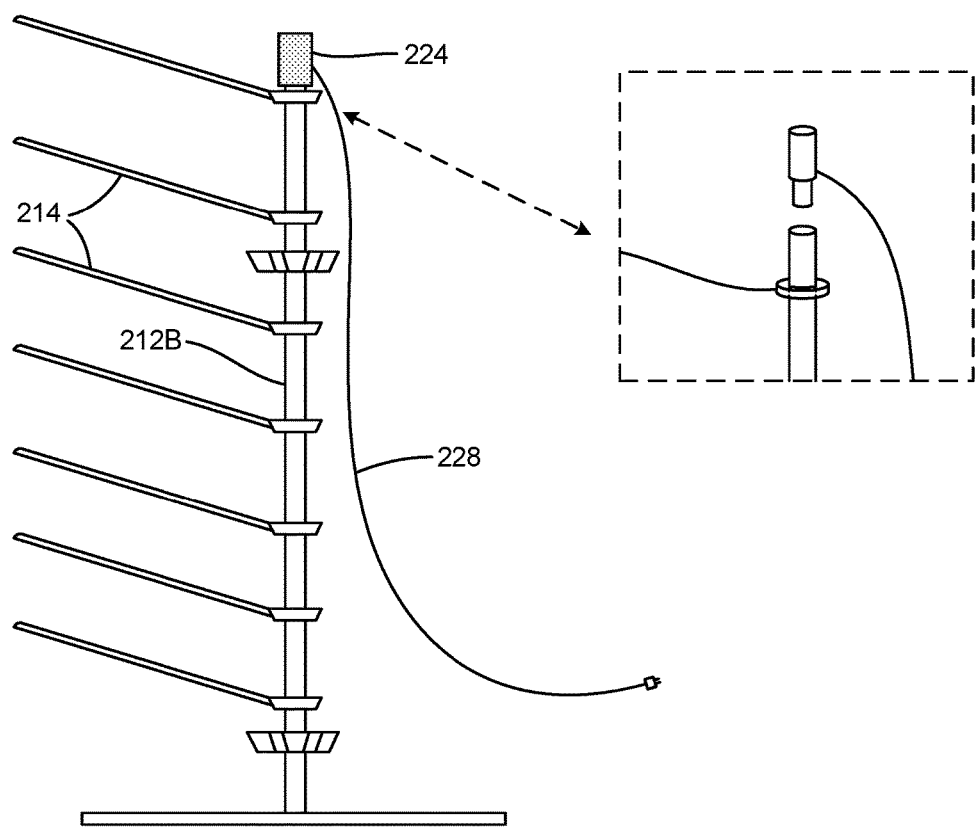
FIG. 21 is a side elevation view of a column mounted power distribution line for a decorative tree.

FIG. 21 is a side elevation view of a column mounted power distribution line for a decorative tree. In FIG. 21, only collapsible bottom section 212B and bottom member 224 are depicted in the deployed state. This figure demonstrates that electrical wire 228 hangs from bottom member 224 so as to transverse vertical locations of pivotable branches 214, thereby being conveniently located to connect to decorative light strings strung thereupon.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An artificial tree apparatus comprising:
   a mount configured to engage a level floor surface;
   a trunk segment configured to couple to the mount so as to be vertically erected with respect to the substantially level floor surface;
   a trunk electrical distribution network of conductive wires engaging the trunk segment and including an electrical connector conductively coupled thereto, the electrical connector having a plurality of electrical contacts configured to couple to a complementary electrical connector so as to receive operating power therefrom, the trunk electrical distribution network configured to conductively provide thereon both the operating power received by the electrical connector and a plurality of lighting control signals;
   a plurality of branch segments, each connected to and extending from the trunk segment;
   one or more branch electrical distribution networks of conductive wires engaging the plurality of branch segments, and configured to receive, from the trunk electrical distribution system, both operating power and at least a subset of the plurality of lighting control signals, each of the one or more branch electrical distribution networks further configured to superimpose thereon both the received operating power and the received at least a subset of the plurality of the lighting control signals; and
   a plurality of independently-controllable lighting elements disposed along and conductively coupled to the one or more branch electrical distribution networks, and each having a local controller configured to control illumination by providing, in response to a corresponding one of the plurality of lighting control signals provided thereto, controlled illumination of the independently controllable lighting element.

2. The artificial tree apparatus of claim 1, further comprising:
   a lighting display controller conductively coupled to the trunk electrical distribution system so as to receive operating power therefrom and to provide the plurality of lighting control signals thereto.

3. The artificial tree apparatus of claim 2, wherein the lighting display controller has a storage module in which a plurality of sets of lighting commands can be stored therein, each of the sets corresponding to one of a plurality of lighting display shows.

4. The artificial tree apparatus of claim 3, wherein the lighting display controller is further configured to wirelessly communicate with a remote controller, the remote controller is configured to permit a user to select one of the plurality of lighting display shows, and to transmit, to the lighting display controller, a signal indicative of the selected one of the plurality of lighting display shows.

5. The artificial tree apparatus of claim 3, wherein the lighting display controller is further configured to wirelessly communicate with a remote conductor module, the remote conductor module is configured to provide a timing signal indicative of a change is the lighting display.

6. The artificial tree apparatus of claim 5, wherein the lighting display controller provides a sequence of lighting commands in response to receiving the timing signal provided by the remote conductor module.

7. The artificial tree apparatus of claim 3, wherein the lighting display controller is further configured to wirelessly communicate with a remote controller, the remote controller configured to permit a user to select a lighting display show and to wirelessly transmit the plurality of lighting commands corresponding to the selected lighting display show to the lighting display controller.

8. The artificial tree apparatus of claim 1, wherein each of the plurality of lighting commands includes an address and an illumination command, the address corresponding to one of the plurality of independently-controllable lighting elements.

9. The artificial tree apparatus of claim 1, wherein each of the one or more branch electrical distribution networks is conductively coupled to the trunk electrical distribution system.

10. The artificial tree apparatus of claim 1, wherein the one or more branch electrical distribution networks comprises only one branch electrical distribution network.

11. The artificial tree apparatus of claim 1, wherein each of the one or more branch electrical distribution networks consists of two conductors.

12. The artificial tree apparatus of claim 1, further comprising:
    one or more tap display controllers, each conductively coupled to a corresponding one of the one or more branch electrical distribution networks, each of the one or more tap display controllers configured to receive both operating power and the at least a subset of the plurality of lighting display commands from the trunk electrical distribution network and to provide both received operating power and the received at least a subset of the plurality of the lighting control signals to the corresponding one or more of the plurality of branch electrical distribution networks connected thereto.

13. The artificial tree apparatus of claim 12, wherein the one or more tap display controllers comprise a plurality of tap display controllers coupled to one another in a daisy chain fashion.

14. The artificial tree apparatus of claim 13, wherein the at least a subset of the plurality of lighting control signals is at least a first subset of the plurality of lighting control signals, and each of the plurality of tap display controllers is further configured to provide, to an adjacent one of the plurality of tap display controllers, both operating power, and at least a second subset of the plurality of lighting control signals, the at least a second subset is complementary to the at least a first subset.

15. The artificial tree apparatus of claim 1, wherein each of the plurality of branch segments is pivotably coupled to the trunk segment so as to have a stowed mode and a deployed mode, wherein an angle between the an axis of the branch segment and an axis of the trunk segment is smaller when in the stowed mode than when in the deployed mode.

16. The artificial tree apparatus of claim 15, further comprising:
a plurality of pivot blocking mechanisms configured to selectively permit or prevent the branch segments to pivot.

17. The artificial tree apparatus of claim 15, further comprising:
a deployment mechanism configured to effect, in response to user actuation, both stowed mode and deployed mode.

18. The artificial tree apparatus of claim 17, wherein the deployment mechanism is a spring actuated deployment mechanism.

19. The artificial tree apparatus of claim 17, wherein the deployment mechanism includes an electrical motor.

20. The artificial tree apparatus of claim 1, wherein trunk segment comprises a plurality of separable portions, each having a mechanical connector and an electrical connector, the mechanical connector configured to couple to a complementary mechanical connector of an adjacent one of the plurality of separable portions so as to align axes of the connected separable portions, the electrical connector configured to couple to a complementary electrical connector of an adjacent one of the plurality of separable portions, so as to conductively couple segments of the trunk electrical distribution network.

* * * * *

UNITED STATES PATENT AND TRADEMARK OFFICE
CERTIFICATE OF CORRECTION

Page 1 of 1

PATENT NO. : 10,337,710 B2
APPLICATION NO. : 16/178367
DATED : July 2, 2019
INVENTOR(S) : Jason Loomis It is certified that error appears in the above-identified patent and that said Letters Patent is hereby corrected as shown below:

On the Title Page

Item (54) and in the Specification Column 1, Line 1, Delete:
"TREE WITH INTEGRATED LIGHTING ELEMENTS RECEIVING POWER AND CONTROL DATA OVER COMMON CONDUCTORS"

Insert:
-- ORNAMENTAL TREE WITH INTEGRATED LIGHTING ELEMENTS RECEIVING POWER AND CONTROL DATA OVER COMMON CONDUCTORS --

Signed and Sealed this
Eighteenth Day of February, 2020

Andrei Iancu
*Director of the United States Patent and Trademark Office*